United States Patent
Wall et al.

(10) Patent No.: US 11,146,391 B2
(45) Date of Patent: Oct. 12, 2021

(54) ORTHOGONAL ACCESS CONTROL FOR GROUPS VIA MULTI-HOP TRANSFORM ENCRYPTION

(71) Applicant: IronCore Labs, Inc., Boulder, CO (US)

(72) Inventors: Robert L. Wall, Bozeman, MT (US); Patrick Joseph Walsh, Boulder, CO (US)

(73) Assignee: IRONCORE LABS, INC., Boulder, CO (US)

( * ) Notice: Subject to any disclaimer, the term of this patent is extended or adjusted under 35 U.S.C. 154(b) by 0 days.

(21) Appl. No.: 16/845,678

(22) Filed: Apr. 10, 2020

(65) Prior Publication Data

US 2020/0259639 A1  Aug. 13, 2020

Related U.S. Application Data

(63) Continuation of application No. 15/965,463, filed on Apr. 27, 2018, now Pat. No. 10,659,222.

(Continued)

(51) Int. Cl.
*H04L 9/08* (2006.01)
*G06F 21/60* (2013.01)
(Continued)

(52) U.S. Cl.
CPC .......... *H04L 9/0836* (2013.01); *G06F 21/604* (2013.01); *G06F 21/606* (2013.01);
(Continued)

(58) Field of Classification Search
CPC ... H04L 9/0836; H04L 9/0825; H04L 9/0833; H04L 9/0838; H04L 9/0861; H04L 9/14;
(Continued)

(56) References Cited

U.S. PATENT DOCUMENTS 8,094,810 B2    1/2012  Hohenberger et al.
8,601,263 B1 *  12/2013 Shankar .............. H04L 63/0428
                                              713/166

(Continued)

FOREIGN PATENT DOCUMENTS

CN   102655508 B    3/2015
WO   2011045723 A1  4/2011
WO   2015101533 A1  7/2015

OTHER PUBLICATIONS

NPL Search (InnovationQ) (Year: 2021).*

(Continued)

*Primary Examiner* — Mahfuzur Rahman
*Assistant Examiner* — Richard W Cruz-Franqui
(74) *Attorney, Agent, or Firm* — Neugeboren O'Dowd PC

(57) ABSTRACT

Disclosed is an orthogonal access control system based on cryptographic operations provided by multi-hop proxy re-encryption (PRE) that strictly enforces only authorized access to data by groups of users, scalable to large numbers of users. Scalable delegation of decryption authority can be shared with a plurality of members of a group whether those members be users or devices, and members of a group can further create sub groups and delegate decryption authority to those members, whether users or devices. Members are granted access via generation of transform keys, and membership or access can be revoked merely by deleting the transform key—no elimination of the encrypted data, regardless of its storage location, is needed.

19 Claims, 34 Drawing Sheets

Related U.S. Application Data

(60) Provisional application No. 62/491,982, filed on Apr. 28, 2017.

(51) Int. Cl.
*H04L 9/14* (2006.01)
*G06F 21/62* (2013.01)

(52) U.S. Cl.
CPC ........ *G06F 21/6209* (2013.01); *H04L 9/0825* (2013.01); *H04L 9/0833* (2013.01); *H04L 9/0838* (2013.01); *H04L 9/0861* (2013.01); *H04L 9/14* (2013.01); *H04L 2209/76* (2013.01)

(58) Field of Classification Search
CPC . H04L 2209/76; G06F 21/604; G06F 21/606; G06F 21/6209
See application file for complete search history.

(56) References Cited

U.S. PATENT DOCUMENTS

| | | | | |
|---|---|---|---|---|
| 9,203,815 | B1* | 12/2015 | Bogorad | G06F 21/6209 |
| 9,344,276 | B2 | 5/2016 | Kawai et al. | |
| 9,866,533 | B2 | 1/2018 | Chazalet et al. | |
| 2001/0014158 | A1* | 8/2001 | Baltzley | H04L 63/126 380/281 |
| 2005/0091381 | A1* | 4/2005 | Sunder Rajan | H04L 61/1547 709/227 |
| 2008/0059787 | A1* | 3/2008 | Hohenberger | H04L 9/3013 713/153 |
| 2010/0095118 | A1* | 4/2010 | Meka | G06F 21/6227 713/168 |
| 2010/0306530 | A1* | 12/2010 | Johnson | H04L 63/0823 713/155 |
| 2013/0212388 | A1* | 8/2013 | D'Souza | H04L 9/0825 713/168 |
| 2014/0075518 | A1 | 3/2014 | D'Souza et al. | |
| 2014/0208117 | A1* | 7/2014 | Hayashi | H04L 63/0471 713/171 |
| 2014/0279557 | A1* | 9/2014 | Abou-Nasr | G06Q 20/3829 705/71 |
| 2015/0222604 | A1* | 8/2015 | Ylonen | G06F 21/575 713/171 |
| 2015/0222605 | A1 | 8/2015 | Ignatenko et al. | |
| 2015/0271153 | A1* | 9/2015 | Rohloff | H04L 63/0464 713/153 |
| 2015/0288527 | A1* | 10/2015 | Vanstone | H04L 9/3066 713/156 |
| 2016/0182467 | A1* | 6/2016 | Hang | H04L 63/0807 713/153 |
| 2016/0182473 | A1* | 6/2016 | Cignetti | H04L 63/0823 713/171 |
| 2016/0352689 | A1* | 12/2016 | Antipa | H04L 9/0841 |
| 2017/0155628 | A1* | 6/2017 | Rohloff | H04L 63/0478 |

OTHER PUBLICATIONS

Robert Wall and Patrick Walsh. Cryptographically Enforced Orthogonal Access Control at Scale. SCC '18: Proceedings of the 6th International Workshop on Security in Cloud Computing (2018) (Year: 2018).*

G. Ateniese, K. Fu, M. Green, and S. Hohenberger. Improved Proxy Re-encryption Schemes with Applications to Secure Distributed Storage. ACM Transactions on Information and System Security (TISSEC) vol. 9, 1 (2006) (Year: 2006).*

M. Blaze, G. Bleumer, and M. Strauss. 1998. Divertible protocols and atomic proxy cryptography EUROCRYPT. Springer-Verlag (Year: 1998).*

Y. Cai and X. Liu. 2014. A Multi-use CCA-secure Proxy Re-encryption Scheme. IEEE 12th International Conference on Dependable , Autonomic, and Secure Computing vol. 7 (2014). (Year: 2014).*

Cruz-Franqui, Richard W., "Office Action Regarding U.S. Appl. No. 15/965,463", dated Feb. 21, 2019, p. 26, Published in: US.

Cruz-Franqui, Richard W., "Office Action Regarding U.S. Appl. No. 15/965,463", dated Jul. 27, 2018, p. 36, Published in: US.

Cruz-Franqui, Richard W, "Office Action Regarding U.S. Appl. No. 15/965,463", dated Sep. 30, 2019, p. 29, Published in: US.

Gruber, Stephen, "Response to Office Action Regarding U.S. Appl. No. 15/965,463", dated Apr. 22, 2019, p. 19, Published in: US.

Gruber, Stephen, "Response to Office Action Regarding U.S. Appl. No. 15/965,463", dated Jun. 21, 2019, p. 17, Published in: US.

Gruber, Stephen, "Response to Office Action Regarding U.S. Appl. No. 15/965,463", dated Oct. 29, 2018, p. 25, Published in: US.

Gruber, Stephen, "Response to Office Action Regarding U.S. Appl. No. 15/965,463", dated Dec. 5, 2019, p. 13, Published in: US.

Nickitas-Etienne, Athina, "International Preliminary Report on Patentability Regarding International Application No. PCT/US2018/029975", dated Oct. 29, 2019, p. 10, Published in: CH.

Ateniese, et al., "Improved Proxy Re-Encryption Schemes With Applications to", Feb. 3, 2015, p. 25, Publisher: Proceedings of the 12th Annual Network and Distributed System Security, Published in: US.

Cai, et al., "A Multi-Use CCA-Secure Proxy Re-Encryption Scheme", Aug. 24, 2014, p. 6, Publisher: 2014 IEEE 12th International Conference on Dependable, Autonomic and Secure Computing, Published in: CN.

Hohenberger, Susan, "600.641—Special Topics in Theoretical Cryptography; Lecture 17: Re-Encryption", Apr. 2, 2007, p. 6, Publisher Johns Hopkins University, Published in: US.

Wang, et al., "A Fully Secure Unidirectional and Multi-Use Proxy", Nov. 9, 2009, p. 3, Publisher: 16th ACM Conference on Computer and Communications Security, Published in: US.

Young, Lee W., "PCT International Search Report and Written Opinion Re International Application PCT/US2018/29975", dated Aug. 2, 2018, p. 17, Published in: WO.

Horbach, Christian, "Extended European Search Report Regarding European Application No. 18790890.0", dated Nov. 30, 2020, p. 9, Published in: EP.

* cited by examiner

FIG. 7A

- U1 / D1A creates a document using app and saves it
  702
- App generates random document encryption key (DEK)
  704
- App encrypts document using DEK
  706
- App encrypts DEK using U1's public key (EDEK-U1)
  708
- App attaches EDEK-U1 to encrypted doc
  710
- App saves combined info to document store
  712

FIG. 7B

- U1 / D1A uses app to share document with G1
  714
- D1A requests document
  716
- Service uses transform key from U1 to D1A on EDEK-U1 (EDEK-U1-D1A)
  718
- Service returns document in envelope
  720
- App decrypts EDEK-U1-D1A using D1A's private key, retrieving DEK
  722
- App encrypts DEK using G1's public key (EDEK-G1)
  724
- App adds EDEK-G1 to document
  726
- App saves updated document info to document store
  728

FIG. 7C

- U2 / D2A uses app to retrieve document
  730
- D2A requests document
  732
- Service uses transform key from G2 to U2 on EDEK-G1 (EDEK-G1-U2)
  734
- Service uses transform key from U2 to D2A on EDEK-G1-U2 (EDEK-G1-U2-D2A)
  736
- Service returns document in envelope
  738
- App decrypts EDEK-G1-U2-D2A using D2A's private key, retrieving DEK
  740
- App crypts document using DEK
  742
- App provides document to U2
  744

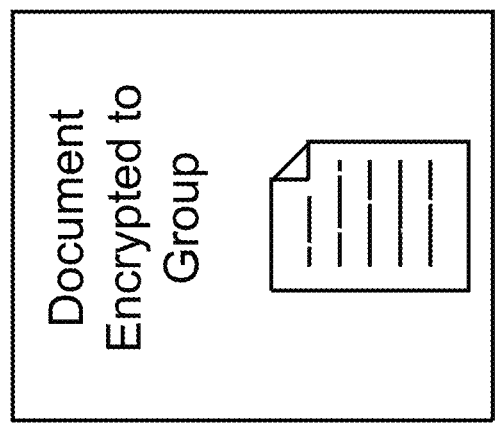
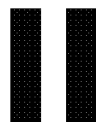
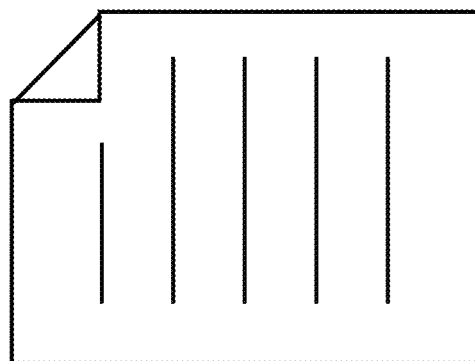
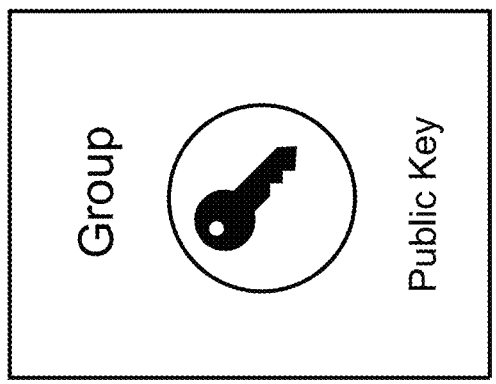
FIG. 10

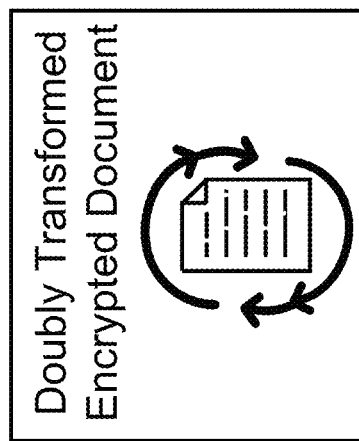
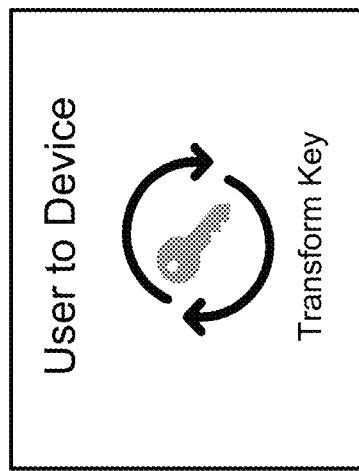
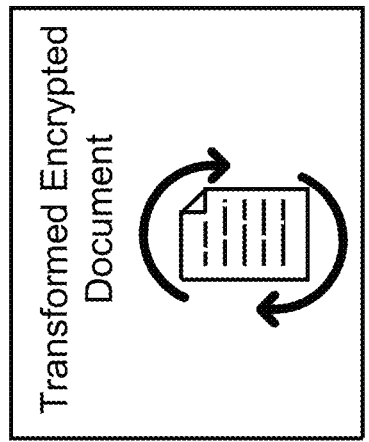
FIG. 17

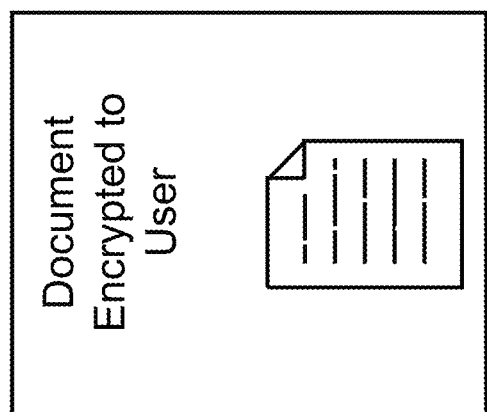
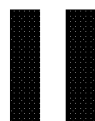
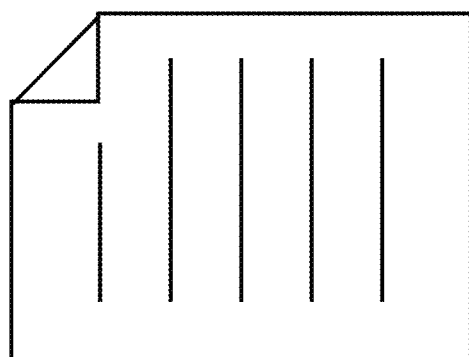
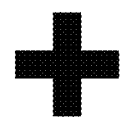
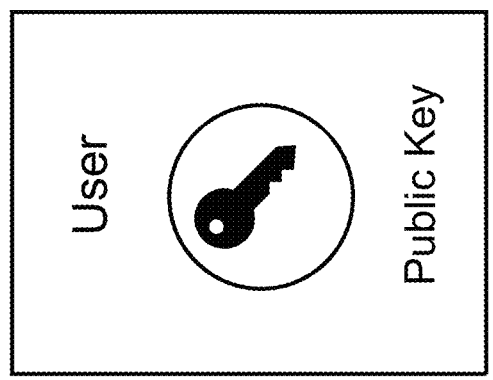
FIG. 22

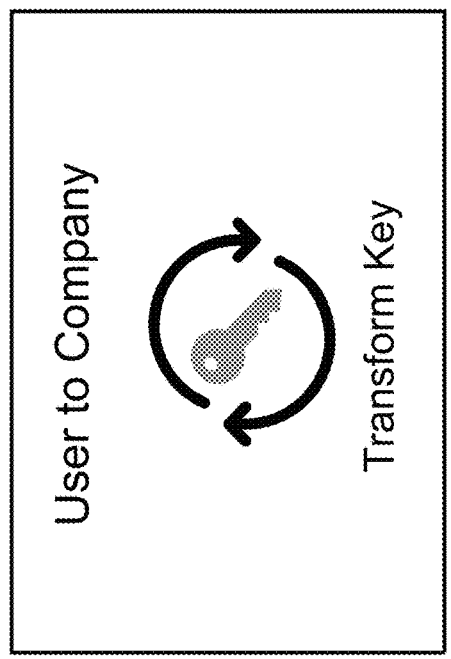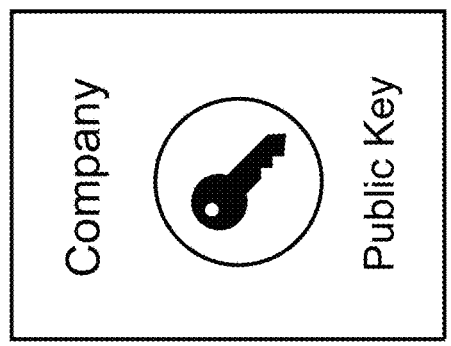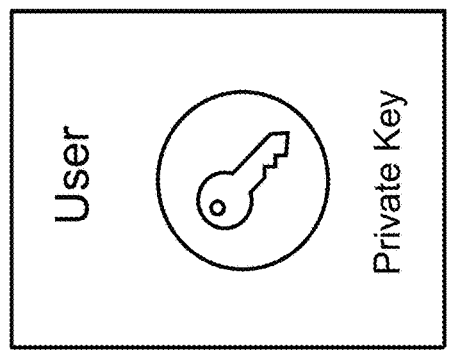
FIG. 31 ps1 US 11,146,391 B2

ORTHOGONAL ACCESS CONTROL FOR GROUPS VIA MULTI-HOP TRANSFORM ENCRYPTION

CLAIM OF PRIORITY UNDER 35 U.S.C. § 119

The present Application for Patent is a Continuation of U.S. Nonprovisional application Ser. No. 15/965,463, filed Apr. 27, 2018 which claims priority to U.S. Provisional Application No. 62/491,982, filed Apr. 28, 2017, both of which are incorporated herein by reference.

FIELD OF THE DISCLOSURE

The present disclosure relates generally to cryptography. In particular, but not by way of limitation, the present disclosure relates to systems, methods and apparatuses for enabling group-based cryptography.

DESCRIPTION OF RELATED ART

Data is the fuel that powers SaaS. In the rare instances where the data is encrypted, it is typically just encrypted "in transit and at rest," which typically translates to "HTTPS and Transparent Disk Encryption." Sadly, these protections lack cryptographic access controls.

Transparent disk encryption leaves data just as visible to an attacker as to a legitimate user. HTTPS isn't much better. It stops casual interception of data, but it doesn't ensure that the person receiving data should be allowed access. It also fails to secure the data at the endpoints.

In short, the standard approach to encryption handles two narrow threats: stolen hard drives and network-level snooping.

Most SaaS companies ignore security concerns when they are small. As they grow, they add network perimeter technologies like firewalls and intrusion prevention appliances, security incident event management platforms, and staff to monitor them. For B2B SaaS, this evolution is driven by larger customers that demand more intense information security reviews during the sales cycle.

Unfortunately, investing in network perimeter technologies was the solution for a bygone era. Outdated regulations and information security standards assume a network environment of decades past.

We've evolved from walking floppy disks between computers to a world of cloud services, remote employees, mobile devices, IoT, and no clear perimeter that contains the data. The complexity of managing access in this environment is beyond the point where a human can reason about it.

Symmetric (Secret Key) vs. Asymmetric (Public Key) Encryption

Modern encryption algorithms can be separated into two categories: symmetric key and asymmetric key. These refer to the way keys are used to encrypt and decrypt data. In a symmetric key cryptosystem, the same key value that Alice uses to encrypt a message must be used by Bob to decrypt the ciphertext and recover the original message. This key can usually be any value, but Alice and Bob must both have the same key in order to securely exchange messages. This requires some separate key exchange mechanism that allows both parties to have the same key.

In an asymmetric key cryptosystem, each user generates a pair of public and private keys. These two values have a mathematical relationship that is specific to the encryption algorithm. Anyone can encrypt a message to Bob using his public key, and he uses his corresponding private key to decrypt the message. It is called a public key because there is no requirement to keep it secret; it can be published in a public directory.

However, public key or asymmetric key systems do not scale well, and in fact become virtually unusable when many thousands and especially tens of thousands of users are involved.

Envelope Encryption

Asymmetric encryption techniques are generally not well suited to encrypt arbitrarily large plaintext messages efficiently. Instead, most implementations of public key cryptosystems use envelope encryption techniques. The plaintext message is encrypted with a symmetric key algorithm (AES, for example), using a randomly generated key. The random key is then encrypted to the desired recipient using the recipient's public key. The symmetrically encrypted plaintext is placed inside an "envelope", which is then "addressed" to the recipient via the asymmetrically encrypted symmetric key.

To access the plaintext message, the receiver strips off the enclosing envelope, locates the entry addressed to her, uses her private key to decrypt the entry, and then uses the resulting symmetric key to decrypt the enclosed ciphertext and recover the plaintext.

Encrypting to Multiple Recipients

This envelope allows you to share a message with multiple recipients easily, without re-encrypting the plaintext multiple times. Instead, you just encrypt the symmetric key multiple times, once to each recipient. The resulting envelope has multiple "addressees", but only one enclosed message.

This technique does have some drawbacks. If you want to share the message with many different recipients, the wrapper might become larger than the actual encrypted message. And the originator must know the public key for each recipient; it is not possible to share with "all IT staff members", for instance. Instead, the originator must determine all the people that are members of the IT staff and address the envelope to each of them. If a new person is added to the IT staff, someone that is on the list of recipients would need to use her private key to decrypt the symmetric key, then encrypt that key to the new staff member's public key and add the new addressee to the envelope. Likewise, if a person transfers from the IT staff to a different department, someone must remove that addressee from the envelope. This must be done for each message that was shared with the IT staff.

Because of these constraints, the usual approach used to encrypt to groups of recipients is not scalable for large or very dynamic groups.

Establishing a Key for a Group

An alternative is to create a public/private asymmetric key pair for the group. Then anyone that wants to share a message to the group can just address the message to the group's public key. However, in order for a member of the group to decrypt the message, she must have the group's private key. This requires the private key to be distributed to each member that is added to the group. If a member is removed from the group and the security of the group's message is to be maintained, it is necessary to choose a new public/private key pair for the group, distribute the private key to all current group members, and then re-address every message that had been encrypted to the group. This is also not scalable for dynamic groups, even if a suitably secure key management mechanism is available.

Supporting Multiple Devices Per User

Users of a system are likely to interact with that system and its data using multiple devices. They might use browsers or native apps running on laptops and personal computers, tablets, or smart phones. The problem of addressing a message to a user such that it can be recovered on any of those devices is very similar to the problem of addressing a message to a group. Either the user must establish a single public/private key pair and install the private key on each of the devices, or the sender of the message must know the public key of each of the recipient's devices and address the message to each of those devices. The first alternative is undesirable because of the issue of key management and distribution, and because the loss of a device requires the creation of a new key pair and re-encryption of everything addressed to the user. The second alternative requires extra work each time a user adds or removes a device.

Proxy Re-Encryption

The idea of proxy re-encryption was first introduced in 1998 by Blaze, Bleumer, and Strauss, who provided a concrete scheme based on El Gamal public key cryptography (see M. Blaze, G. Bleumer, and M. Strauss. 1998. Divertible protocols and atomic proxy cryptography. In *EUROCRYPT*. Springer-Verlag, 127-144). This PRE scheme had the following properties: (1) Each participant has a public-private key pair. (2) A participant, the delegator, can delegate decryption of messages to a delegatee. The delegator generates a re-encryption key that can be used to re-encrypt any messages encrypted to her public key so that the delegatee can decrypt them using her private key. This avoids the need for the delegator to share her private key with the delegatee. (3) The re-encryption keys are held by one or more semi-trusted proxies that perform the re-encryption of messages. A re-encryption key does not allow decryption of messages or provide access to either party's private key. (4) Delegation is revoked when a proxy deletes the relevant re-encryption key.

For example, if Alice plans to be unavailable for a period of time and wants to delegate her messages to Bob, she uses her private key and Bob's public key to generate a re-encryption key, which she stores with her proxy. Each message that is encrypted to Alice and delivered to the proxy is re-encrypted to Bob and is delivered to him. When Alice is again available and wants to revoke delegation, she just removes the re-encryption key from the proxy.

In 2006, Ateniese et al. introduced the first unidirectional PRE scheme (see G. Ateniese, K. Fu, M. Green, and S. Hohenberger. 2006. Improved Proxy Re-encryption Schemes with Applications to Secure Distributed Storage. *ACM Transactions on Information and System Security (TISSEC)* 9, 1 (2006), 1-30). The authors also enumerated a list of useful properties of PRE protocols, including the following: (1) Directionality, which describes whether delegation from A to B also allows re-encryption from B to A. Unidirectional schemes do not allow this. (2) Interactivity, which describes whether both parties must be actively involved in order to generate the re-encryption key. A non-interactive scheme only requires the public key of the delegatee. (3) Transitivity, which describes whether a proxy can re-delegate decryption. That is, if the proxy holds a re-encryption key from A to B and a re-encryption key from B to C, can it generate a re-encryption key from A to C? A non-transitive scheme does not allow this. (4) Collusion safety, which describes whether it is possible for a delegatee to collaborate with a proxy that holds a re-encryption key to that delegatee to recover the secret key of the delegator. A collusion-safe scheme does not allow this.

In 2007, Canetti and Hohenberger proposed a definition of security against chosen-ciphertext attacks (CCA-security) on PRE schemes and introduced an algorithm that satisfied the definition (see R. Canetti and S. Hohenberger. 2007. Chosen-ciphertext Secure Proxy Re-encryption. In *Proceedings of the 14th ACM Conference on Computer and Communications Security (CCS)*. ACM, New York, N.Y., USA, 185-194. DOI:h p://dx.doi.org/10.1145/1315245.1315269). They also outlined several open problems in PRE construction, including the construction of a unidirectional PRE scheme that was also multi-hop (also called multi-use); that is, a scheme that allows an encrypted message that has been re-encrypted from Alice to Bob to subsequently be re-encrypted from Bob to Carol, if Bob has delegated access to Carol. (The scheme they proposed was multi-hop, but it was bidirectional.)

In 2009, Wang and Cao proposed a scheme that addressed this problem—a CCA-secure unidirectional, multi-hop, collusion-safe, non-interactive PRE algorithm (see H. Wang and Z. Cao. 2009. A Fully Secure Unidirectional and Multi-use Proxy Re-encryption Scheme. *ACM CCS Poster Session* (2009)). The CCA-security of their scheme was subsequently challenged by Zhang and Wang (see J. Zhang and X. A. Wang. 2013. On the Security of Two Multi-use CCA-secure Proxy Re-encryption Schemes. *Int. J. Intelligent Information and Database Systems* 7, 5 (2013), 422-440). In 2014, Cai and Liu expanded on the issue and introduced a second security issue with the algorithm, then provided a modification that resolved both problems (see Y. Cai and X. Liu. 2014. A Multi-use CCA-secure Proxy Re-encryption Scheme. IEEE 12th International Conference on Dependable, Autonomic, and Secure Computing 7 (2014)). They also included a proof of CCA-security for the modified scheme.

This PRE scheme, like most others that have been proposed, provides five distinct cryptographic primitives: (1) "KeyGen"—client-side generation of public/private key pair (this is the standard elliptic curve key generation algorithm); (2) "ReKeyGen"—client-side generation of a re-encryption key between a pair of entities; (3) "Encrypt"—client-side encryption of a message to a recipient; (4) "ReEncrypt"—proxy-side re-encryption of an encrypted message; (5) "Decrypt"—client-side decryption of an encrypted or re-encrypted message.

There has been a large volume of research on access control in cloud computing environments, including the publication on outsourcing computation without relinquishing control by Chow et al. (see R. Chow, P. Golle, M. Jakobsson, E. Shi, J. Staddon, R. Masuoka, and J. Molina. 2009. Controlling data in the cloud: outsourcing computation without outsourcing control. In *Proceedings of the ACM Workshop on Cloud Computing Security*. ACM, 85-90), the work on cloud-scale fine grain access control by Yu et al. (see S. Yu, C. Wang, K. Ren, and W. Lou. 2010. Achieving secure, scalable, and fine-grained data access control in cloud computing. In *Proceedings of the IEEE International*

Conference on Computer Communications), and the work on end-to-end secure content sharing by Xiong et al. (see H. Xiong, X. Zhang, D. Yao, and X. Wu. 2012. Towards End-to-End Secure Content Storage and Delivery with Public Cloud. In *Proceedings of the second ACM conference on Data and Application Security and Privacy (CODASPY'12)*. 257-266). Several different cryptographic approaches have been proposed, including identity-based and attribute-based approaches such as the hierarchical ABE scheme proposed by Wang et al. (see G. Wang, Q. Liu, and J. Wu. 2010. Hierarchical attribute-based encryption for fine-grained access control in cloud storage services. In *Proceedings of the ACM Conference on Computer and Communications Security*. IEEE, 735-737).

Proxy re-encryption has featured prominently in a significant amount of research. Among the many works, Xu et al. describe a certificateless PRE scheme (see L. Xu, X. Wu, and X. Zhang. 2012. CL-PRE: A certificateless proxy re-encryption scheme for secure data sharing with public cloud. In *Proceedings of the 7th ACM Symposium on Information, Computer and Communications Security*. ACM, New York, N.Y., USA, 87-88), and Liu et al. propose a time-limited delegation scheme based on PRE (see Q. Liu, G. Wang, and J. Wu. 2014. Time-based proxy re-encryption scheme for secure data sharing in a cloud environment. In *Information Sciences*, Vol. 258. Elsevier, 355-370). Qin et al. present a comprehensive survey of works proposing PRE for use in data sharing in the cloud (see Z. Qin, H. Xiong, S. Wu, and J. Batamuliza. A Survey of Proxy Re-Encryption for Secure Data Sharing in Cloud Computing. In *IEEE Transactions on Services Computing*, Vol. PP., No. 99).

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

This disclosure describes systems, methods, and apparatus for cryptographic orthogonal encryption and decryption of group and multi-hop proxy re-encryption (PRE), scalable to large numbers of users. Ultimately this disclosure enables devices to share and revoke access to encrypted data to larger numbers of other devices and with lower latency, than is currently possible. This disclosure also enables devices to revoke access to encrypted data, regardless as to where the encrypted data is stored (e.g., on other servers or devices owned and controlled by other entities) without destroying the encrypted data. This scalable, group-based, and multi-hop right of revocation is not enabled by previous PRE schemes.

Some embodiments of the disclosure may be characterized as a system for orthogonal access control to data by groups of devices using public key cryptography to provide provable cryptographic access controls that change which users are able to decrypt data without modifying the encrypted data. The system can include a first device controlled by a first user having a first transform module. The system can also include a key server having: a transform key storage; a second device controlled by a second user having a second transform module, a public key, and a private key; wherein the first device includes a non-transitory, tangible processor readable storage medium, encoded with processor executable code to administer orthogonal access control to data by groups of devices using public key cryptography. The method can include: generating a public key and a private key for the first user; creating a first group of users by generating a public key and a private key for the first group of users, by the first device, where the first user is an administrator of the first group of users; encrypting data to the first group of users by encrypting the data to the public key of the first group of users to form a first ciphertext; adding the second user to the first group of users by generating a transform key from the first group of users to the second user, by the first transform module of the first device, using (1) the private key for the first group of users and (2) the public key for the second user; and storing the transform key from the first group of users to the second user in the transform key storage of the key server. The second device can include a non-transitory, tangible processor readable storage medium, encoded with processor executable code to decrypt the first ciphertext. The method can include generating a transform key from the second user to the second device, by the second transform module of the second device, using the private key of the second user and the public key of the second device; transmitting a request from the second device to the key server for access to the first ciphertext; and granting the request by, on the key server: transforming the first ciphertext with the transform key from the first group of users to the second user to form a first transformed ciphertext; and transforming the first transformed ciphertext with the transform key from the second user to the second device to form a first doubly-transformed ciphertext. The method can further include decrypting the first doubly-transformed ciphertext to reveal the data on the second device using the private key of the second device.

Other embodiments of the disclosure may also be characterized as a method for orthogonal access control to data by groups of devices using public key cryptography to provide provable cryptographic access controls that change which users are able to decrypt data without modifying the encrypted data. The method can include generating a public key and a private key for the first user. The method can also include creating a first group of users by generating a public key and a private key for the first group of users, by the first user, the first user being an administrator of the first group of users. The method can also include encrypting data to the first group of users by encrypting the data to the public key of the first group of users to form a first ciphertext. The method can also include generating a public key and a private key for a second user. The method can also include adding the second user to the first group of users by generating a transform key from the first group of users to the second user, by the first user, using (1) the private key for the first group of users and (2) the public key for the second user. The method can also include storing the transform key from the first group of users to the second user with a server, where the server cannot decrypt the data via access to the transform key from the first group of users to the second user nor access the first or second user's private keys or the first group's private key. The method can also include decrypting the data by the second user by: transmitting a request from the second user to the server for access to the first ciphertext; granting the second user access to the first ciphertext by, on the server, transforming the first ciphertext with the transform key from the first group of users to the second user to form a first transformed ciphertext or denying access to the second user if no transform key from the first group of users to the second user exists; and decrypting the first transformed ciphertext to reveal the data to the second user using the private key of the second user.

Other embodiments of the disclosure may also be characterized as a non-transitory, tangible computer readable storage medium, encoded with processor readable instructions to perform a method for orthogonal access control to data by groups of devices using public key cryptography to provide provable cryptographic access controls that change which users are able to decrypt data without modifying the encrypted data. The method can include generating a public key and a private key for the first user. The method can also include creating a first group of users by generating a public key and a private key for the first group of users, by the first user, the first user being an administrator of the first group of users. The method can also include encrypting data to the first group of users by encrypting the data to the public key of the first group of users to form a first ciphertext. The method can also include generating a public key and a private key for a second user. The method can also include adding the second user to the first group of users by generating a transform key from the first group of users to the second user, by the first user, using (1) the private key for the first group of users and (2) the public key for the second user. The method can also include storing the transform key from the first group of users to the second user with a server, where the server cannot decrypt the data via access to the transform key from the first group of users to the second user nor access the first or second user's private keys or the first group's private key. The method can also include decrypting the data by the second user by: transmitting a request from the second user to the server for access to the first ciphertext; granting the second user access to the first ciphertext by, on the server, transforming the first ciphertext with the transform key from the first group of users to the second user to form a first transformed ciphertext or denying access to the second user if no transform key from the first group of users to the second user exists; and decrypting the first transformed ciphertext to reveal the data to the second user using the private key of the second user.

Other embodiments of the disclosure can be characterized as a method for orthogonal access control to data by groups of devices using public key cryptography to provide provable cryptographic access controls that change which users are able to decrypt data without modifying the encrypted data. The method can include providing an administrator and generating, by the administrator, a public key and a private key for a first group. The method can also include generating, by a first member, a public key and a private key for the first member. The method can further include generating, by the administrator, a first transform key from the first group to the first member, the transform key formed from the private key for the first group and the public key for the first member, the first member becoming a first member of the first group once the first transform key is generated. The method can further include encrypting data to the first group by encrypting the data to the public key of the first group to form a first ciphertex. The method can further include storing the first transform key on a server that does not have access to the data. The method can further include decrypting the data by the first member of the first group by: transmitting a request from the first member of the first group to the server for access to the first ciphertext; granting the first member of the first group access to the first ciphertext by, on the server, transforming the ciphertext using the first transform key from the first group to the first member of the first group into a first transformed ciphertext; and decrypting the first transformed ciphertext to reveal the data to the first member of the first group using the private key of the first member for the first group.

In the above method, the first member of the first group can be a device and the first group can include devices belonging to the administrator. Similarly, the first member of the first group can be a user and the first group can include the user and one or more other users. Additionally, the first group can further include a second administrator, and the method further comprising generating, by the second administrator, a second transform key for a second member, the second transform key formed from the private key for the first group and a public key for the second member, wherein the second member becomes a second member of the first group once the second transform key is generated. What is more, the method can also include providing a third administrator; generating, by the third administrator, a public key and a private key for a second group; generating, by a second member, a public key and a private key for the second member; and generating, by the third administrator, a second transform key from the second group to the second member, the second transform key for the second member formed from the private key for the second group and the public key for the second member, the second member becoming a second member of the second group once the second transform key is generated.

In other embodiments, the second member of the second group can be the first group. Further, the method can include encrypting data to the second group by encrypting the data to the public key of the second group to form a second ciphertext and decrypting the data by the first member of the first group by. This can be done by transmitting a request from the first member of the first group to the server for access to the second ciphertext; granting the first member of the first group access to the second ciphertext by, on the server, transforming the second ciphertext using the second transform key from the second group to the second member of the second group into a second transformed ciphertext, then transforming the second transformed ciphertext using the first transform key from the first group to the first member of the first group to form a first doubly-transformed ciphertext; and decrypting the first doubly-transformed ciphertext to reveal the data to the first member of the first group using the private key of the first member of the first group.

At the same time, the first member of the first group can be a user, and the second member of the second group can be a device of the user, where the second group can be a user.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 7A illustrates a method of sharing an encrypted document with a group and delegating decryption authority to members of the group;

FIG. 7B illustrates a method of sharing a document with a group;

FIG. 7C illustrates a method of a user in the group decrypting the shared document;

FIG. 10 illustrates an embodiment of data (e.g., a document) being encrypted to a group of users or devices by utilizing the group's public key;

FIG. 17 illustrates an embodiment of a method for transforming a ciphertext into a doubly-transformed ciphertext;

FIG. 22 illustrates how data can be encrypted to a user;

FIG. 31 illustrates an embodiment of a user granting permission to a company to use her private data;

DETAILED DESCRIPTION

Figure 1:
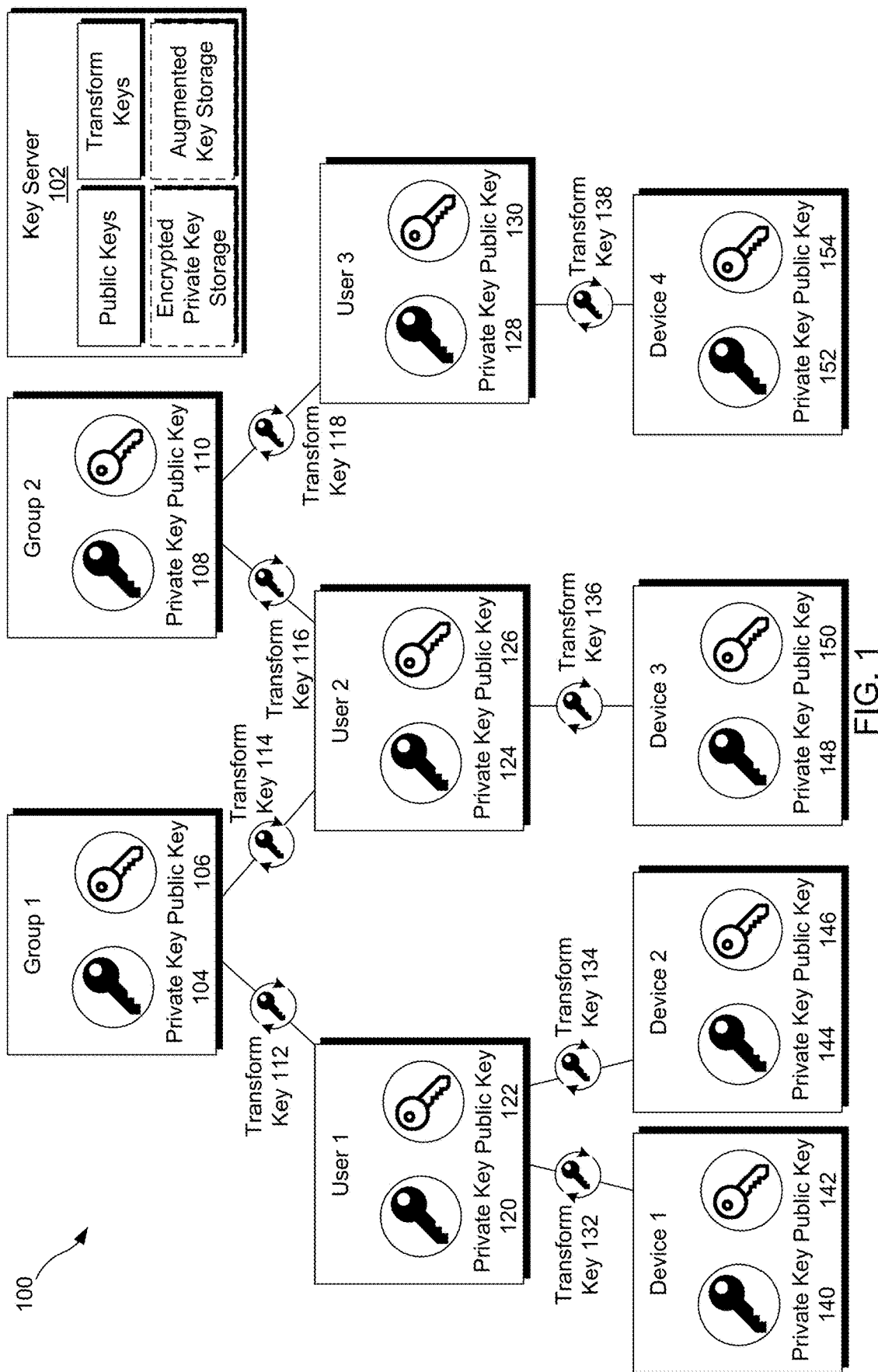
FIG. 1 illustrates one embodiment of a system for performing multi-hop transform cryptography for a group of users, each of which has one or more devices.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For the purposes of this disclosure, "provable cryptographic access controls" means that the system can guarantee that access controls cannot be circumvented. In other words, one can prove who can access a piece of data because it is encrypted to a finite list of public keys, and only those people who hold private keys corresponding to those public keys can gain access.

For the purposes of this disclosure a transform key can be described as a transform key from A to B or as an A-to-B transform key. For instance, a transform key for a user to a device is the same as a user-to-device transform key.

Securing data in transit, at rest, and within applications is difficult, particularly at cloud scale. As data becomes increasingly distributed between cloud services, mobile devices, the Internet of Things, and portable media, managing access to that data wherever it is stored or used is progressively more difficult. Cryptographic techniques are commonly used to increase trust in cloud services and to provide more reliable security and access control in a world of distributed data. In particular, end-to-end encryption is seeing more wide-spread adoption. However, current end-to-end encryption tools are mostly restricted to person-to-person communication applications like messaging and email.

In the future, everyone will control who can access private data. Imagine granting a doctor access to your medical records, then revoking that access when you switch doctors. More importantly, suppose you could track other parties with whom your doctor shared data, including insurers, billing companies, cloud software companies, outsourced labs, research institutions, and so on. You wouldn't need to just trust these folks with your data: you could monitor how they use it, and you could revoke their access if they abuse the privilege.

Businesses, Governments, and other organizations need to control their data every bit as much as we do. Trusting sensitive data to yet another cloud service provider is a huge leap of faith. Each new service complicates an organization's ability to understand their risks and who has access to their data. Without that understanding, they can't meet contractual and regulatory requirements around privacy and security.

This is why large organizations demand extensive information security reviews, with lengthy spreadsheets, before purchasing and why, in many cases, they don't even consider a service that might otherwise make them more competitive.

In a world of customer-controlled data, organizations no longer need to hope their partners have good-enough security. The security travels with the data, and the usage of that data is monitored. With control comes trust, and trust brings options, flexibility, and for SaaS vendors who embrace it, more sales.

Practical systems that manage access to data by groups of users typically resort to a model using an access control server that manages symmetric keys and hands them to requesting users based on policy. While public key-based systems have a better security model, they suffer from scalability and complexity problems. Consider, for example, using pretty good privacy (PGP) to secure data. A user can securely encrypt a file to a set of other users, given their public keys. However, there is a linear increase in the time and space required to encrypt the file to each user. When access to an encrypted file must be granted to a new user, someone with access to the file must decrypt it, then re-encrypt it to the entire list, plus the new recipient. If files are encrypted to teams of people and a person leaves the team, every file shared with the team must be found, decrypted, and re-encrypted to the list minus the departing user. The same process is followed if a user's keys are compromised. This solution does not scale to large groups of users.

This disclosure proposes a system that is built to embed in applications to provide cryptographically backed access controls for data and to separate deciding to whom data is encrypted from deciding who can decrypt data—an advantage herein referred to as "Orthogonal Access Control." The system uses public key cryptography, and it overcomes the scalability difficulties using abstract entities that represent groups of users. These groups facilitate orthogonal decisions regarding granting access to data, because users can choose the groups to which to encrypt data, while group administrators can independently add users to and remove users from a group at any time. These changes are done in constant time and are independent of the number of groups, group members, or affected files in the system. The system provides end-to-end encryption, with the final step involving decryption using a user/device's private key, which may be retained on the user's device. This allows servers (for managing the encryption process including keys and group memberships) to be semi-trusted, with no access to unencrypted data and no ability to decrypt data.

While proxy re-encryption (PRE) schemes provide properties that are well suited to building such a system, this disclosure describes updates to traditional PRE schemes that allow scalability and much faster proxy re-encryption to large numbers of users. This disclosure also utilizes multi-hop PRE (e.g., a user's device accessing data that the user is authorized to access due to her membership in a group; a group's accessing data that a parent group is authorized to access due to its membership in its own parent group).

Orthogonal Access Control

With orthogonal access control, the decision of to whom to encrypt is separated from the decision of who can decrypt. This disclosure accomplishes this advantage by abstracting classes of users and services into groups, encrypting to the appropriate group, and determining at another point in time which users belong to the group. Only the group members' private keys can unlock the data.

For example, a company might have an SSN-Readers group consisting of employees authorized to see social security numbers. The group is owned by an administrator who holds the group's private key and can use that key to add and remove members. When a document is encrypted to this group, members can decrypt the data with their private keys, but no one else can. Even the administrator can't read the data if the administrator is not a member of the group.

This disclosure performs this at scale and without shared secrets. Groups can be any size, even millions of users, and adding and removing members are constant time operations regardless of how many documents or users there are (i.e., this disclosure can perform encryption and decryption for any sized group in the same amount of time).

This disclosure allows a user to choose one or more groups to whom to grant access to encrypted data. Independently and asynchronously, group administrators choose which users belong to the groups. Adding a member to the group is simply accomplished in constant time, irrespective of the size of the group or the amount of data the group can access. Likewise, removing a member from a group is a constant time operation that does not require modification of any encrypted data.

Additionally, a user can be abstracted as a collection of devices (i.e., a group comprising a plurality of devices). In this way, a user can control which devices are able to decrypt certain data. A user can thereby add devices or revoke access from a particular device (e.g., when a new laptop is purchased or when a smartphone is stolen).

Cryptographic Transformation

Academia has long discussed "proxy re-encryption" or PRE, which will herein be referred to as Cryptographic Transformation (e.g., US20080059787). This disclosure discusses a variation of Cryptographic Transformation that is unidirectional, multi-hop, and adds multi-party computation to protect group private keys.

In academia, the focus is on person-to-person delegation, such as when an assistant is granted permission to read the boss's encrypted emails. In contrast, this disclosure optimizes for use cases that revolve around access control at scale. The herein disclosed approach ensures that only certain classes of users can read specific classes of data.

For example, consider the case where a Top Secret document is to only be read by users with Top Secret clearance. Suppose Alice and Bob both are members of the TopSecret group, and the TopSecret group has a single public key. Alice shares a document with the TopSecret group by encrypting the document using the group's public key. Since asymmetric encryption is not well suited to encrypting large amounts of data, a technique called "envelope encryption" can be used. This technique involves using a symmetric key encryption such as AES-256 to encrypt the data, using a randomly generated symmetric key (called the document encryption key (DEK)). This encrypted data is placed inside an "envelope", and the symmetric key is then encrypted using asymmetric key encryption and attached to the "envelope" as a form of address to which it should be delivered. This is called an encrypted document encryption key (EDEK).

When Bob wants to decrypt the document, he sends the document "envelope" to an key server (e.g., see 902 in FIG. 9) for transformation. The key server takes the EDEK from the envelope and transforms it so that Bob will be able to decrypt it with his private key. The key server does not have access to the DEK at any point in the process. Nor does the key server perform the transformation for users who are not members of the TopSecret group. When Bob gets the transformed EDEK back, he decrypts it locally with his private key and gets the DEK, then uses that to decrypt the document that was inside the envelope. All of this happens in a fraction of a second.

It should be noted that a variant of Elliptic Curve Cryptography, which is a form of public key cryptography, can be used to perform the herein noted transformations. However, other forms of cryptography than Elliptic Curve Cryptography can also be used to perform such transformations.

Multi-Hop Transform Cryptography for Hierarchies of User Groups and Device Groups This disclosure addresses the problem of scaling cryptography for groups and groups of devices. Transform cryptography is an enhancement to public key cryptography. It enables someone to whom messages or documents are being encrypted to delegate the ability to decrypt those messages or documents to someone else, without actually giving the delegator's private key to the delegatee. This involves a public key infrastructure based on elliptic curve cryptography. Every user and every device have its own public/private key pair that is generated locally on the device. Backend servers and services that need to access sensitive data also have their own keys, which can be segmented by service, region, or other logical category.

Transform cryptography involves the delegator (referred to as Alice) wanting to delegate the ability to decrypt her messages to another person (referred to as Bob). Alice uses her private key and Bob's public key to compute a transform key. This transform key can be used by a key server (e.g., 902 in FIG. 9) that has the transform key and a message that is encrypted to Alice to re-encrypt the message, such that only Bob can decrypt the message using his public key. This key server cannot use the transform key to actually decrypt the message, and even Bob and the key server cannot work together to compromise Alice's private key. In some embodiments, the key server, rather than Alice, computes the transform key.

This disclosure discusses systems, methods, and apparatus enabling transform encryption for groups of users and devices and multi-hop transform encryption (e.g., multiple layers of groups of users and devices). In one embodiment, Alice creates a public/private key to represent her (see User U1 in FIG. 1 and block 210 in FIG. 2), then for each of her devices (see D1A and D1B in FIG. 1), she creates a public/private key pair for each device (see Blocks 206 and 306). She then computes a transform key from her private key to each device's public key (see Blocks 212 and 312) and stores these transform keys with the key server (see Blocks 216 and 316).

Anyone that wants to "address" an encrypted message to Alice (using the envelope encryption described previously) encrypts using her public key. Anytime Alice uses one of her devices to retrieve one of these encrypted messages, her device sends its public key to the key server, and the key server locates the appropriate transform key and transforms the EDEK so it is encrypted using her device public key instead of her user public key and returns the transformed EDEK to Alice. Her device can then decrypt the EDEK to recover the DEK and then decrypt the actual message.

Any time Alice obtains a new device that she would like to use to decrypt data, she just generates a key pair for that device, computes the transform key from her user to the new device, and sends the transform key to the key server. If she loses or otherwise decommissions a device, she just asks the key server to delete the transform key (i.e., access revocation).

Transform cryptography similarly provides an elegant solution to the problem of encrypting data to groups. The person that is the administrator of a group, e.g., Claire (e.g., User 1 or U1 in the figures), first creates a public/private key pair for the group, then for each of the group's members, Claire computes a transform key from the group to the member. Then anyone that wants to access a message encrypted to the group just provides her public key to the key server—if it can find a transform key between the group and the user, it transforms the EDEK to that user.

If the transform encryption algorithm is multi-hop (also known as multi-use), both problems can be solved together. Say Bob has been added to the "G1" group and has configured his iPad to access his messages. If he tries to access a message encrypted to "G1" using his iPad, the iPad sends its public key to the key server. The key server looks for a transform key from the iPad to Bob, and then for a transform key from Bob to the "G1" group. If both keys are available, the key server first transforms the EDEK from "G1" to Bob, then transforms the result from Bob to his iPad. When the iPad gets this EDEK and the encrypted message, it can recover the DEK and decrypt the message.

Transform cryptography allows multiple devices per user and cryptographically secured groups to be managed in a scalable fashion. A user can easily associate her devices to her main identity and then access any messages encrypted to her without requiring any re-encryption. Likewise, a user can be added to or removed from groups quickly and easily. The size of the envelope for a message encrypted to a group does not increase in size, regardless of the number of members in the group, and no update to the message envelope is required to add or remove members. If a user is removed from a group or a user decommissions a device, removal of the transform key from the key server definitively revokes access.

A multi-hop transform cryptography algorithm can also be used to create a system that can support a more extensive hierarchy than groups of users that consist of groups of devices. A user could create a group and add members to that group that are users or other groups. Transformations could be applied successively through multiple layers of a hierarchy of groups and users to transform data encrypted using a group's public key until the data is finally encrypted using a device's public key, at which time a requesting device could use its private key to decrypt the data.

Revocation Problem Addressed Via Key Augmentation

Known cryptographic methods have problems revoking access to data by an administrator. Consider a group that is administered by two different people. Each person must have a copy of the group's private encryption key in order to add members to the group. If one of those people is removed from the group and should no longer have any access, that person might retain the group's private key. If that person obtained a message that was encrypted to the group, the private key could be used to decrypt the message, with no involvement of the key server required.

We have devised a novel key augmentation technique that eliminates this problem. When a user first generates the public/private key pair (either for the user or for a group), the user retains the private key and sends the public key to the key server. The key server then generates a random factor and multiplies the public key by that factor, creating a new augmented public key for the user or group. The key server retains this factor and associates it with the user or group. Any time a transform key is generated from that user or group to a device or user, the key server augments it using the same factor.

Because the augmented public key is no longer mathematically related to the private key, the private key cannot decrypt messages encrypted to that public key. However, messages that are encrypted to that public key can be re-encrypted to a user or device using the augmented transform key, and they can then be decrypted properly by the private key of the target device. This ensures that access to encrypted messages can always be revoked by removing the appropriate transform key, even if the original private key for the group or user is compromised.

Customer Managed Keys Problem

An application of the herein disclosed transform cryptography technique is support for customer managed keys. Consider a system where every user, group, and device have a public/private keypair, with all the appropriate transform keys stored on a key server, and where data is always encrypted to at least one user or group. Further, suppose the system is multi-tenant, where several different companies use the same system to manage their data, but they wish to maintain control of their data, such that other tenants, and even the operator of the system, cannot access the data.

If each tenant creates a group and adds each of its users to that group, and if any data that is stored for that tenant is encrypted to the tenant's group, then the tenant's data cannot be read by anyone other than members of the group (that is, the tenant's users). This access control is enforced by the encryption of the data. The tenant can decide to allow the operator of the system to access data by also encrypting it to a separate group. The tenant can add users from the operator to that group, which allows those users to also access the tenant's data. If at any time the tenant wants to stop the operator's access, the tenant simply removes those users from the group.

As described previously, this approach allows the application that is manipulating the tenant's data to ignore the group membership; it just encrypts the data to the tenant group and the operator group, and users can be added or removed as necessary without necessitating any re-encryption of data.

The GDPR Protection Problem

Another application of transform cryptography is to facilitate several of the consumer protections that are required by the upcoming European Union GDPR (General Data Protection Regulation). These include the requirement that a customer gives consent to use her private data, that the customer is able to revoke consent, and that the customer has the "right to be forgotten", which is also known as "data erasure". The latter protection stipulates that the subject identified by some set of data can request that this data be erased so that it can no longer be accessed or processed. This can be accomplished in many data processing systems by simply deleting the data; however, this does not handle any copies of the data that may have been made; for example, in a database backup.

To enforce these protections using transform cryptography, as a user's information is being collected, that data can be encrypted to the user's public key. This ensures that only the user is able to access the data. If the user consents to allow another group to access that user's information, the user can generate a transform key from the user to the group. Once the transform key is generated, any members of the group can use the transform cryptography techniques disclosed herein to access the data. Any backups or copies of the user's data should be the encrypted data. If the user wishes to revoke consent for a group to access her data, she can just remove the transform key that she has created from her user to the group. This effectively erases the data, since members of the group are no longer able to recover the data. Even though it is still present in backups and copies, it is rendered inert.

In addition to supporting the requirement to provide consent and to revoke consent, the system can support the user's right to access information about how and when her personal information was used. This information can be maintained by tracking each time that the user's encrypted data was transformed.

Data Locality

Some government rules (e.g., Europe) preclude certain data from leaving a country or region's borders. These rules can be burdensome since data often migrates across borders during common Internet and networking activity. To allow common Internet and networking activity while still abiding by these locality rules, data may be encrypted using the herein disclosed transform cryptography, meaning that only encrypted data passes over country/region boundaries. Further, since the transform keys can be stored on one or more key servers, and those servers may remain within a given country or regional boundary, the cross-border data transmission may meet exceptions in locality laws and rules, since no non-encrypted data and no keys, are passing over boundaries.

Security Breaches

Some regulations require that various undesirable actions have to be triggered if a breach of data security occurs (e.g., HIPAA rules). Triggers include hacking of private data, but also hacking of a server including both encrypted private data and one or more keys needed to decrypt the data. Often, hacking events are able to access both the encrypted data and the key(s) and therefore trigger a HIPAA or other regulatory breach.

The herein disclose transform cryptography can avoid such triggers even where a breach occurs, by storing the transform keys on a separate server (e.g., a key server). In other words, where a breach occurs on a user device, only the encrypted data will be pilfered, and possibly the users public and private keys. However, the data cannot be decrypted even with those public and private keys. Instead, the transform key is needed, and this remains on a key server or may not even be created until decryption is desired.

EMBODIMENTS OF THE INVENTION

FIG. 1 illustrates one embodiment of a system for performing multi-hop transform cryptography for a group of users, each of which has one or more devices. In particular, group 1 (G1) has two users, user 1 (U1) and user 2 (U2), and group 2 (G2) has two users, U2 and user 3 (U3). Each user has at least one device, and U1 has two devices, device 1 (D1A) and device 2 (D1B). U1 executes encryption, decryption, and management of G1 via D1A and/or D1B, and U2 executes encryption and decryption via device 3 (D2A). U2 can manage G2 via D2A. U3 executes encryption and decryption via device 4 (D3A). The key server stores all public keys and transform keys, and it also computes all encryption transformations using the stored transform keys.

This system is built on the primitives provided by proxy re-encryption (PRE). Each group, user, or device in this system can be considered a node in a hierarchy, where each node is assigned an asymmetric key pair, consisting of a private key and a corresponding public key that is mathematically related to the private key. A transform key can be formed to transform the encryption of any data encrypted to a node in the hierarchy into data encrypted to one of its child nodes in the hierarchy. Each transform key is formed by combining a public key from the child node and a private key from the parent node. For instance, the transform key 112 between group 1 and user 1 is formed from a combination of the user 1 public key 122 and the group 1 private key 104. Each transform key represents a membership relationship (e.g., a user belonging to a group, a device belonging to a user, or a group belonging to another group). Once formed, the public keys and transform keys are transmitted to the identify service 102 and stored in memory on a server hosting the key server 102 (e.g., a key server). Data can be encrypted to a group or to a user, or to a combination of groups and users. Any application that wishes to encrypt data to a group or user requests the public key for that entity from the key server 102. It encrypts the data using that public key and stores the encrypted data.

Data is always decrypted by a device. When a device wishes to decrypt data, it locates an instance of the desired data that was encrypted to one of its parents in the hierarchy (either a user or a group). Preference is given to the closest parent; if the data is encrypted to the device's user and also to a group that includes that user, it will use the instance of the data encrypted to the user. The device passes the encrypted data to the key server 102. The key server locates the transform keys associated with the path from the device to the node in the hierarchy to whom the data was encrypted, and it applies those transforms in order to create an encryption of the data that can be decrypted by the requesting device. For instance, if data item DI1 is encrypted to U1 and device D1A requests access to DI1, the key server 102 locates transform key 132, applies it to DI1 encrypted to U1, and returns the transformed encrypted data to D1A. D1A then uses private key 140 to decrypt the data and recover DI1. If a second data item DI2 is encrypted to group G2, and device D2A requires access to that data item, D2A sends encrypted DI2 to key server 102. The key server 102 locates transform key 116 (which transforms from G1 to U2) and transform key 136 (which transforms from U2 to D2A), transforms encrypted DI2 using transform key 116 so that DI2 is encrypted to U2, then transforms that encrypted data using transform key 136, so it is now encrypted to D3A. The key server 102 returns this doubly-transformed encrypted data to D3A, which uses private key 148 to decrypt, recovering DI2.

It should also be noted that while U1 has been described as the administrator of G1, in other embodiments, U2 can be the administrator of G1, or both U1 and U2 can be administrators of G1. In yet another embodiment, the administrator of G1, whether U1 or U2, may not be a member of G1.

The orthogonal access control disclosed in FIG. 1 enables scalability of a PRE scheme, because any application can choose which groups or users to whom to encrypt data without knowing which users belong to the groups or which devices are associated with each user. Users can be added to a group before or after data is encrypted to that group, and likewise devices can be associated to a user at any time. There is no necessity to locate previously encrypted data and perform any additional steps to enable access by a new group member or a new device. The system also enables scalability of the right to revoke access to encrypted data. It is not necessary to locate all data that was encrypted to a user and re-encrypt it in order to remove access to that data by one of the user's devices; instead, the transform key from the user to the device is deleted. Likewise, a user can be removed from a group by removing the transform key from the group to the user.

Figure 2:
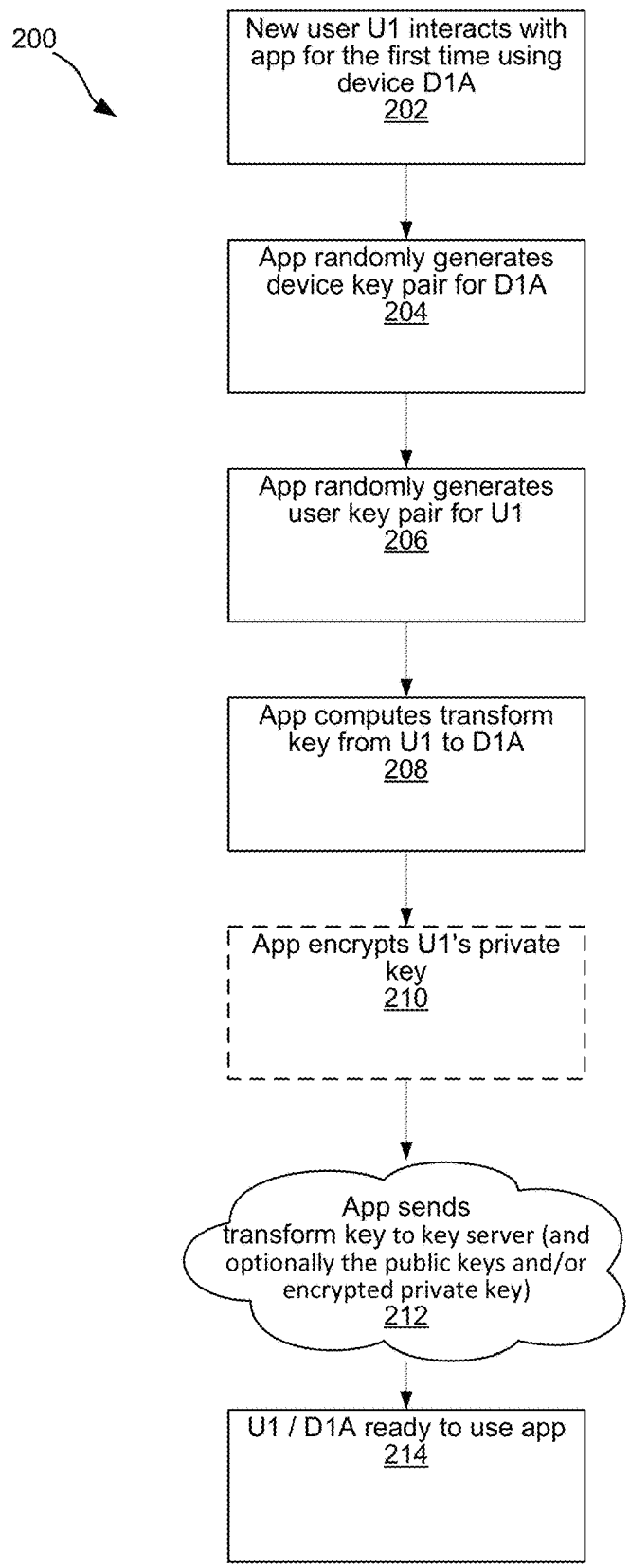
FIG. 2 illustrates an embodiment of a method for adding a new user to the system.
Figure 3:
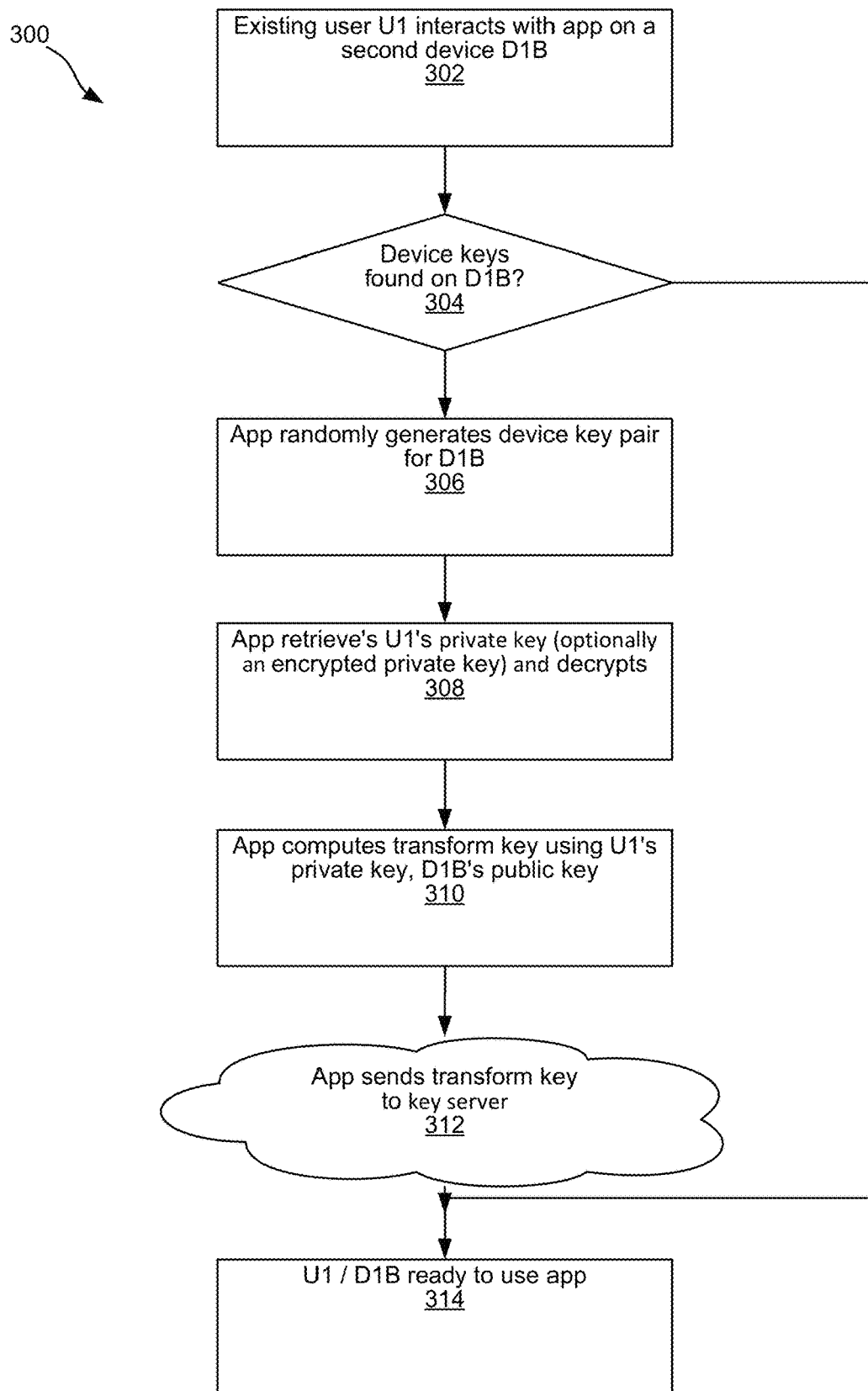
FIG. 3 illustrates adding a new device to a registered user.

FIGS. 2 through 7 illustrate a method of performing multi-hop transform cryptography for a group of users and devices. To initialize a user, the method 200 launches or invokes an encryption client on a user's device and either adds the user or recognizes that the user is already recognized by the encryption client. That is the end of the method 200 and would constitute the formation of nodes user 1 (e.g., U1) and device 1 (e.g., D1A). However, the user may then want to access its encrypted data on the device or create/manage a group of users and devices. FIG. 3 illustrates a method for registering the user's second device (e.g., D1B). If the user wishes to create a group (e.g., G1), then the method 400 can be invoked, where user 1 is the lone member of this group. If the user wishes to add other members to the group 1, the method 500 illustrates a method for registering one or more devices to a second user, and the method 600 illustrates a method of adding the second user to the group 1. The second user, user 2, can act as an administrator of a sub-group comprising its one or more devices, just as the first user is an administrator for a sub-group comprising its two devices.

The following paragraphs describe the methods in FIGS. 2-6 in greater detail.

FIG. 2 illustrates an embodiment of a method for adding a new user to the system. The method 200 can begin with user 1 interacting with an encryption-enabled application for the first time using device 1 (Block 202). In some embodiments, encryption may be performed in the background and as such, user 1 may interact with an e-mail application, spreadsheet program, Slack, or other application or web portal that can pass encrypted data to another user device. The encryption client on the user's device randomly generates an asymmetric key pair for the device 1 (Block 204), and a separate asymmetric key pair for the user (Block 206). The order of generating these key pairs is interchangeable. The device key pair can be created using an elliptic curve key generation algorithm (the KeyGen algorithm described later in this disclosure). The encryption client can store the private keys for the device and the user in secure local storage on device 1. The encryption client can also optionally provide a method to encrypt the user's private key so it can be escrowed securely by the key server (Block 210).

This key escrow is provided to allow the user to recover their private key in the event that device 1 is no longer available or the secure storage is no longer accessible. There are several different methods that can be used to encrypt the private key, including but not limited to the following:

prompt the user to enter a passphrase, use a standard key derivation algorithm such as PBKDF2 to derive a key from the passphrase, and use that key with a symmetric-key encryption algorithm such as AES256-GCM to encrypt the private key;

prompt the user to provide a removable storage device such as a USB memory stick. The client application could generate a random key that it uses with a symmetric-key encryption algorithm such as AES256-GCM to encrypt the private key, then store the random key on the removable storage device;

prompt the user to provide a security device such as a Yubikey that could generate and securely store a random key and provide that key to the client application. The client application could use that key with a symmetric key algorithm such as AES256-GCM to encrypt the private key.

Given a new user and the newly created asymmetric key pair for the user 1 and the newly created asymmetric key pair for the user's device, D1A, the encryption client can compute a user-to-device transform key (e.g., 132) for data to be transformed from user 1 to device 1 (Block 208). The user-to-device transform key can be formed from the user 1 private key (e.g., 120) and the device 1 public key (e.g., 142). The transform key from user 1 to device 1 can be registered or stored in the key server (Block 212) and user 1 and device 1 can be considered initialized (Block 214) (i.e., data can be encrypted using user 1's public key, and user 1 can use device 1 to access any data encrypted using user 1's public key). Optionally, newly-formed user 1 public key and the device 1 public key can also be registered or stored on the key server. The user 1 private key can optionally be removed from the device 1 memory after it is encrypted and after the user-to-device transform key is generated. Additionally, the encryption client may also store an ID of the user and the encrypted private key for the user 1 in the key server, as described previously. The encryption client can also store the user 1 and device 1 private keys on memory of device 1.

In an embodiment, the private key for device 1 is not encrypted and stored in escrow by the key server. Accordingly, if the device private key is lost, then the user can re-register the device using the method 300.

While the method 200 has been described relative to user 1 and device 1, it can also be used to register any number of other devices to user 1, or any number of devices to any user. This initialization of users and devices can occur in parallel, sequentially, or some combination thereof.

FIG. 3 illustrates adding a new device to a registered user. When an instance of the encryption client accesses the system from a new device that does not have an asymmetric key pair assigned to it yet (e.g., when the device is being added to a user) (Decision 304), the encryption client can invoke the process for key generation to randomly generate a public/private key pair for the device (Block 306), then store the private key in secure local storage on the device. The device then retrieves the user's escrowed private key and decrypts it (Block 308). The details of this decryption depend on the mechanism used to encrypt the private key for escrow, as described previously. Once the user's private key has been retrieved and decrypted, the encryption client can then invoke a transform key generation process (Block 310) to create a transform key from user 1 to device 2 using user 1's private key and device 2's public key. The encryption client can then register the user's identity, the device's public key, and the transform key from user 1 to device 2 on the key server (Block 312) and can then discard the user's private encryption key as it is no longer needed. At this point, user 1 (U1) can use device 2 (D1B) to access any data encrypted using user 1's public key (Block 314).

Figure 4:
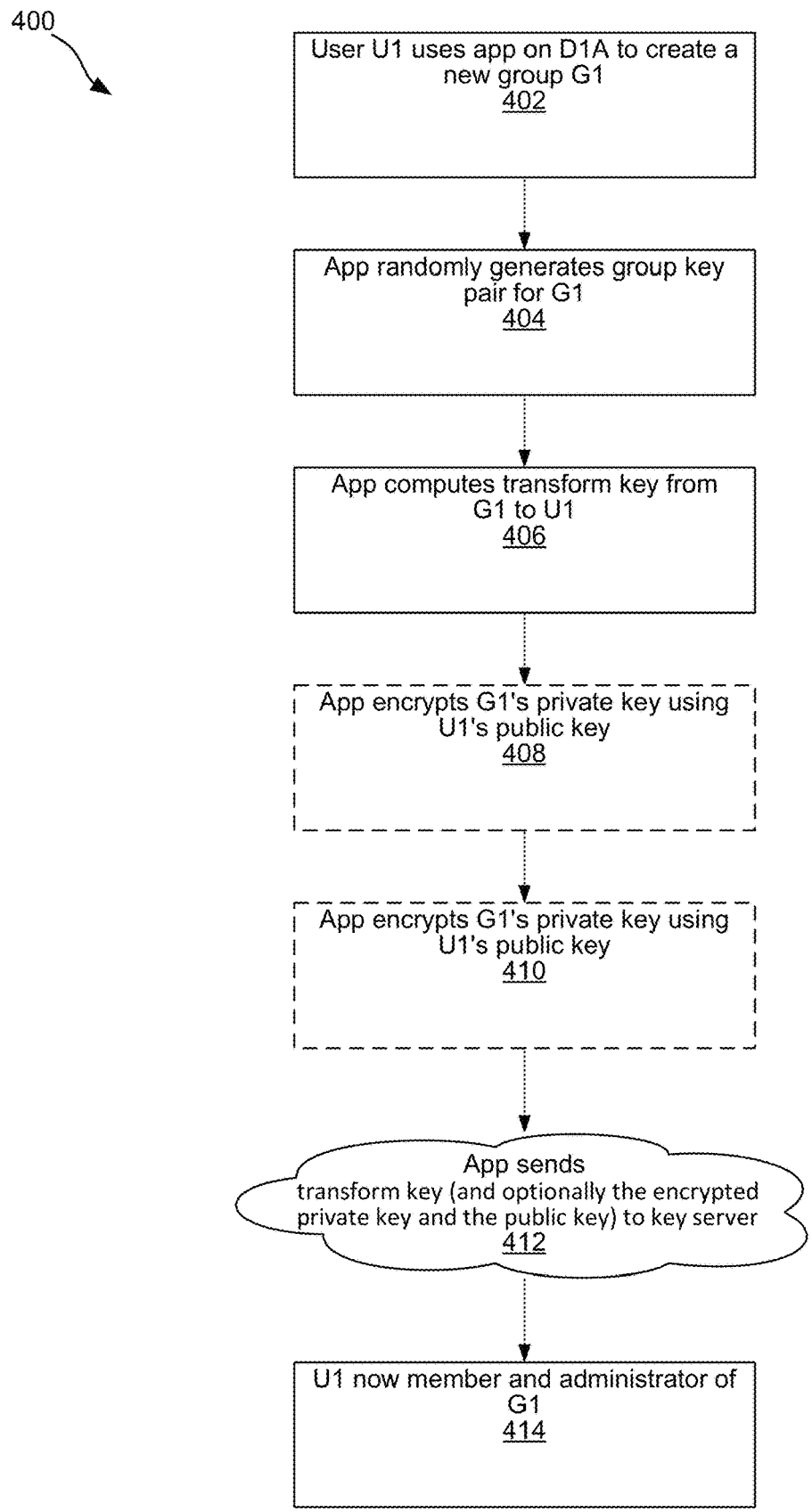
FIG. 4 illustrates a method for creating a group of one or more users, each user having one or more devices.

FIG. 4 illustrates a method for creating a group of one or more users, each user having one or more devices (Block 402). When a user, for instance U1, initiates group creation, the encryption client on the user's device, for instance D1A, randomly generates a public/private key pair for the group (Block 404). This may invoke the KeyGen function, which will be described in detail later in this disclosure. The encryption client then generates a transform key from G1 to U1 (e.g., 112) using G1's private key (e.g., 104) and U1's public key (e.g., 122) (Block 406). This may invoke the TransformKeyGen function. The user that first creates a key pair for the group can be considered the administrator of the group. The encryption client may encrypt the group's private key using the administrator's public key, effectively treating the group's private key as a message or document and encrypting it using the administrator's public key (Block 408). The encryption client can then register, the group's public key, the transform key from G1 to U1, the encrypted version of the group's private key, an ID of the group, and an ID of the user to the key server (e.g., 102) (Block 412) for storage. The encryption client may discard the group private key. At this point, the user can be considered a member of the group (because there is a transform key from G1 to U1) and also an administrator of the group (because G1's private key is encrypted with U1's public key) (Block 414). The method 400 can also be used to add other users to a group (e.g., FIG. 6) and can be used by other users to create additional groups that may or may not overlap in terms of users.

Figure 5:
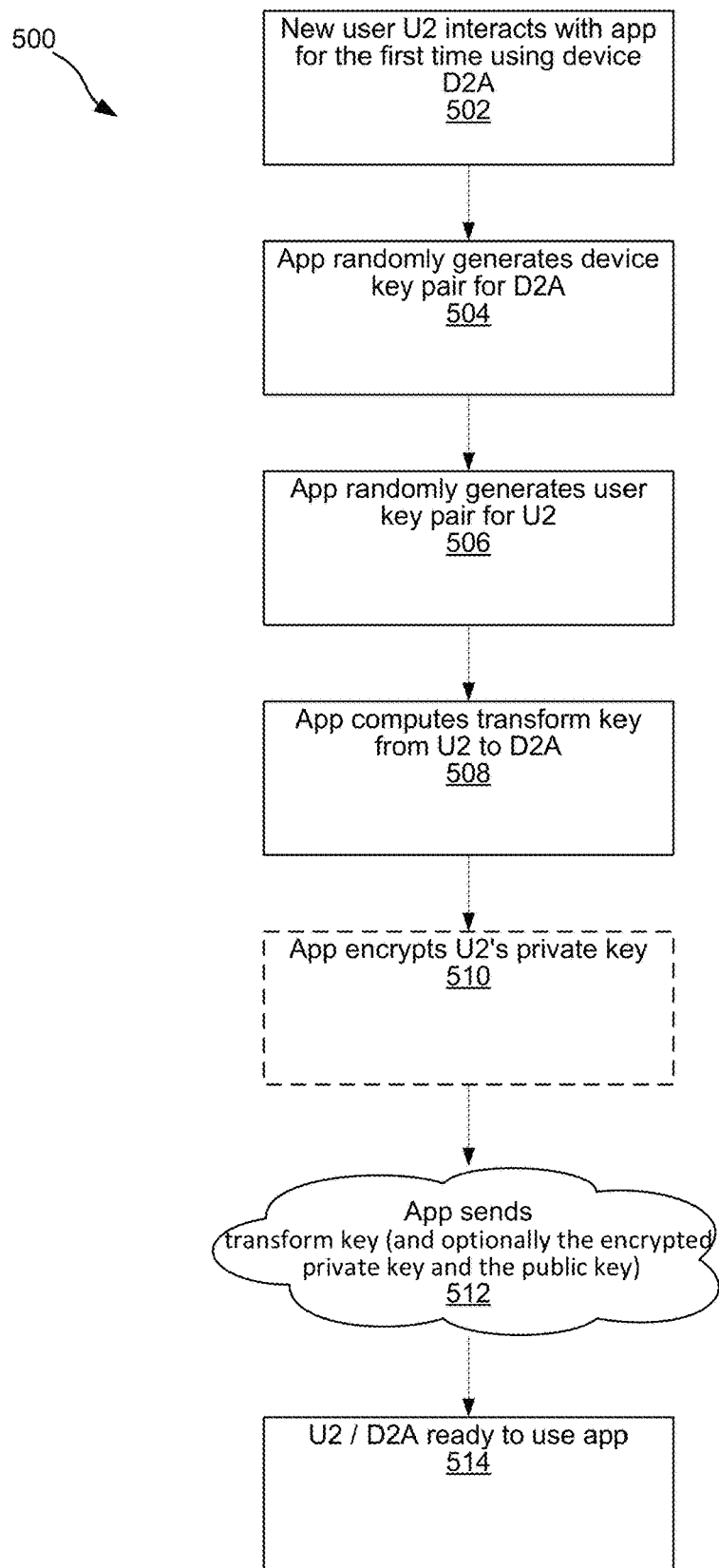
FIG. 5 illustrates a method of registering a new user.

FIG. 5 illustrates a method of registering a new user. When a new user, for instance, U2, interacts with an app for the first time using a first device of U2, for instance, D2A (Block 502), the app on D2A randomly generates a public/private key pair for D2A (Block 504). The app then randomly generates a public/private key pair for U2 (Block 506). The app then computes a transform key from U2 to D2A (Block 508). It then optionally encrypts U2's private key, using one of the mechanisms described earlier (Block 510). The app sends the public keys, transform key from U2 to D2A, and encrypted private key to the key server (Block 512). U2 and D2A are now ready to use the app (Block 514).

Figure 6:
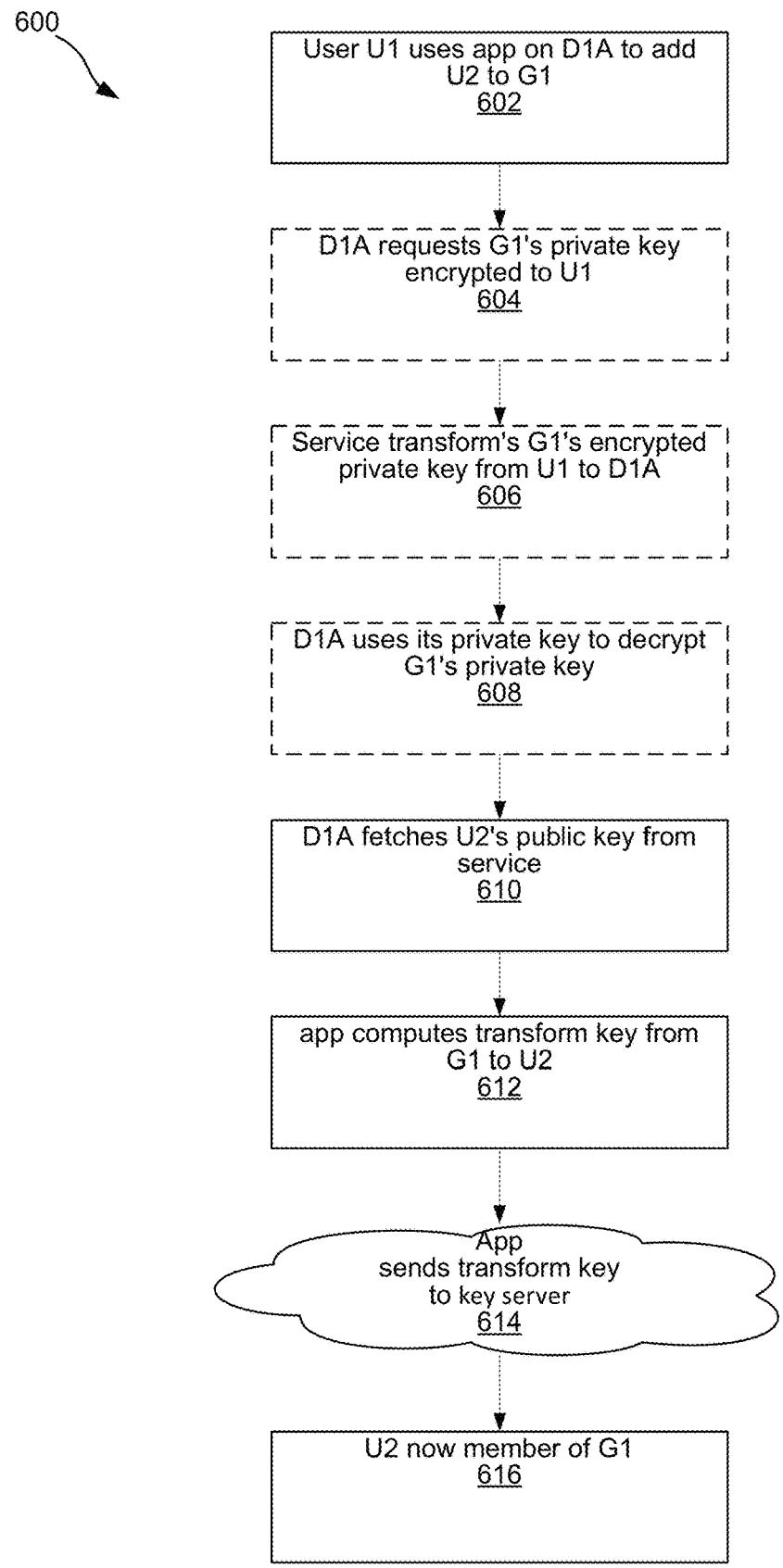
FIG. 6 illustrates a method of adding additional users to a group.

FIG. 6 illustrates a method of adding additional users to a group. Adding a user effectively means granting them access to any data shared with the group. A user can only be added after that user has been registered (i.e., they already have a public key registered to the key server, by application of the method 200). When a user, such as U1, who is the administrator of a group, such as G1, wishes to add a new registered user to a group, such as U2 being added to G1 (Block 602), the encryption client on one of the group administrator's devices, such as D1A, requests the group's private key (e.g., 104) encrypted to U1 from the key server (Block 604). The key server uses the transform key from U1 to D1A to transform the encrypted private key and returns the transformed key (Block 606). D1A uses its device private key to decrypt the transformed key and recover G1's private key (Block 608). D1A then fetches the new user's public key (e.g., 126) from the key server (Block 610), then calculates a transform key from G1 to U2 (e.g., 114) (Block 612). The encryption client then sends the transform key from G1 to U2 to the key server for storage (Block 614) and the new user is considered a member of the group (e.g., U2 a member of G1) (Block 616). Additional users can be added to the group in this same manner.

A group member may also remove herself from a group by sending a request for her removal to the key server. If the key server confirms that she is a member of the group specified in the removal request, then the key server locates the transform key from the group to her user and deletes the transform key.

An administrator may also add one or more additional administrators. Where a user is already registered, the encryption client on the first administrator's device can retrieve the to-be-added administrator's public key and the group private key from the key server. The encryption client can then decrypt the group's private key and encrypt the group private key using the public key of the to-be-added administrator. The client associates the to-be-added administrator's user ID and the new encrypted group private key with the group and registers this information with the key server.

An administrator can also remove another administrator's privileges, if they are both administrators of the same group. To do so, one administrator of the group sends the group ID and ID of the to-be-removed administrator to the key server. The key server confirms that the requester is an administrator for the specified group, and if so, locates the private key for the group that is encrypted using the public key of the administrator to be removed and deletes that encrypted private key.

Given the above details of initializing users and devices, creating groups, and adding users to groups, the following figures describe methods to delegate decryption authority to group members and to also revoke delegated decryption authority.

FIG. 7A illustrates a method of sharing an encrypted document with a group and delegating decryption authority to members of the group. The method 700 can be described with reference to the exemplary network of groups, users, and devices seen in FIG. 1, though this method is equally applicable to other configurations of groups, users, and devices. User 1 may desire to share a document with members of group 1. Using device 1, user 1 can create a document (Block 702). The encryption client on device 1 can then generate a random document encryption key (DEK) (Block 704) and can invoke a symmetric key encryption primitive to encrypt the document data (Block 706). This may involve invocation of the Encrypt Document process. The encryption client then retrieves the public key 122 for user 1 from the key server 102 and encrypts the DEK using this public key 122 (Block 708), which may involve invocation of the Encrypt process. This produces an encrypted DEK or EDEK that is associated with an ID of user 1. The encryption client can then register the document ID, the user 1 ID, and the EDEK with the key server. The encryption client then attaches the encrypted document key to the document and stores this in a document store (Block 710), which may involve returning the encrypted document to the application that created the document for storage by this application.

FIG. 7B illustrates a method of sharing a document with a group. A user U1 that shares or delegates access to encrypted data is one who was previously granted access to the encrypted data, for instance via an application encrypting the data using U1's public key, as shown in FIG. 7A.

Continuing with the example presented in FIG. 7A, user 1 can indicate a desire to share the document with members of group 1 (either expressly or via attaching the document to an e-mail, uploading the document to a cloud-based file sharing service such as Google Drive, Dropbox, or Box, etc.) (Block 714). This desire is typically indicated via interaction with an application. The device of user 1, D1A, can then request the document (Block 716). The key server can use the transform key from U1 to D1A (132) to transform the DEK that was encrypted using U1's public key (EDEK-U1) so it is can be decrypted by D1A (EDEK-U1-D1A) (Block 718). The service returns the transformed EDEK to the application (Block 720). The application can then use device 1's private key 140 to decrypt EDEK-U1-D1A and recover the DEK (Block 722) and then encrypt the DEK with group 1's public key 106 to form EDEK-G1 (Block 724). The application can then add the new EDEK-G1 to the document (Block 726) and store the document key in the document store with the still-encrypted document (Block 728).

This process can also be described as follows: User 1, using device D1A, can request an EDEK for the document from the key server. The key server can search for the shortest access path that is available between the document and the device. This can include searching a list of EDEKs for the document to find one that is encrypted with user 1's public key. If there isn't one, the key server can look for one that is encrypted with the public key of a group that includes the user. If the key server can find an EDEK, it can transform (e.g., invokes Transform on the entry) the EDEK once (if the EDEK was encrypted with the user's public key), or twice (if the EDEK was encrypted with a group's public key) and return the transformed EDEK. The client can use the device's private key to decrypt the response and retrieve the DEK. The client can then retrieve the public key of each recipient from the key server and encrypt the DEK (e.g., invokes Encrypt) and each public key to generate a new list of EDEKs. The client can then send this list along with the document ID to the key server for storage.

FIG. 7C illustrates a method of a user in the group decrypting the shared document. User 2 (U2) can use an application, such as a cloud file storage service like Google Drive, Box, or DropBox, an e-mail client, etc. to retrieve the encrypted document (Block 742). An instance of the encryption client on device 3 (D2A) can request the EDEK for the document from the key server. The key server can identify a path from device 3 to user 2 to group 1 (Block 746) and retrieve the EDEK encrypted with group 1's public key, EDEK-G1 and the transform key from G1 to U2, 114, then use that transform key to transform the EDEK so it can be decrypted by U2 (Block 734). The key server can then retrieve the transform key from U2 to D2A, 136, and use that transform key on the transformed EDEK to produce a doubly-transformed EDEK that can be decrypted by D2A (Block 736). The key server can then return the doubly-transformed EDEK to the encryption client (Block 738). The encryption client can use the private key for D2A, 148, to decrypt EDEK-G1-U2-D2A and retrieve the DEK (Block 740). The application can then use the DEK to decrypt the document (Block 742) and present the decrypted document to user 2 (Block 744).

This process can also be described as follows: Decrypt Document can be invoked from a specific device on behalf of the current user. Similar to the sharing case, the client can send a request for the EDEK to the key server. The key server can search for the EDEK and if found, transform it to the user's device and return it. The client can invoke Decrypt on the EDEK, using the device private key to retrieve the DEK. If this is successful, the client can invoke the symmetric key decryption primitive, using the DEK to decrypt the encrypted document that was provided by the embedding application.

Figure 8:
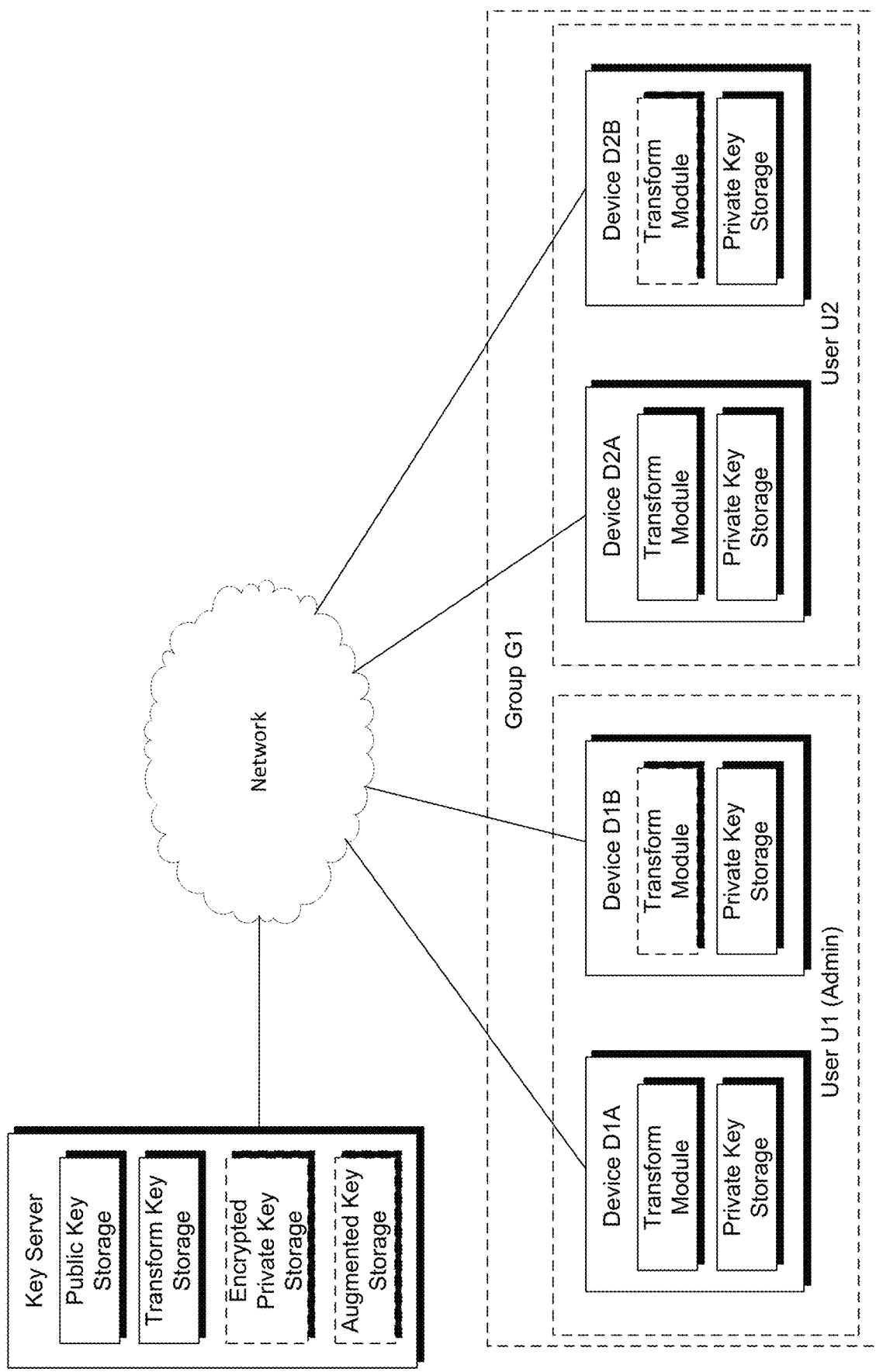
FIG. 8 illustrates an embodiment of a system to provide orthogonal access control which is cryptographically enforced using groups of users and multi-hop proxy re-encryption.

FIG. 8 illustrates an embodiment of a system to provide orthogonal access control which is cryptographically enforced using groups of users and multi-hop proxy re-encryption. The system 800 includes a first user, U1, and a second user, U2, each having two devices, D1A, D1B, D2A, and D2B. The users are part of a group, G1, and U1 is the administrator of the group. Both users are also administrators of subgroups comprising their devices. When a user is registered for the first time, a device upon which the user is accessing the system randomly generates a public and private key pair for the user, a public and private key pair for the device, and a transform key from the user to the device and stores the public keys and the transform key on a public key storage of a key server. Optionally, the user's private key can be encrypted and stored on an optional encrypted private key storage of the key server. The admin's device can also generate a public and private key for group G1 when it is created and store the public key on the key server (and optionally an encrypted version of the private key on the key server). To add a member to G1, whether that member is the administrator herself, U1, or the second user, U2, a transform key from the group to the user is generated and stored in a transform key storage of the key server. Any device that is registered to a user is also associated with a new transform key from the user to the device that is generated and stored on the key server. The transform keys for devices can be generated by whichever device a user is using to register a new device.

Each device can include a private key storage to store a respective private key once generated. Each device that a user uses to administer a group of users and/or devices can include a transform module. Thus, the transform module is optional on devices not being used for administration functions. It is important to note that for G1 administration, only the transform module of D1A is needed. In order for U2 to register her devices, D2A and D2B, one of these two devices can have a transform module. Implementation of a transform module on a device of the group administrator as well as on a device of a group member who is not an administrator (because it is needed to administer a subgroup including her devices) is at least one feature not seen in prior art PRE schemes.

Figure 9:
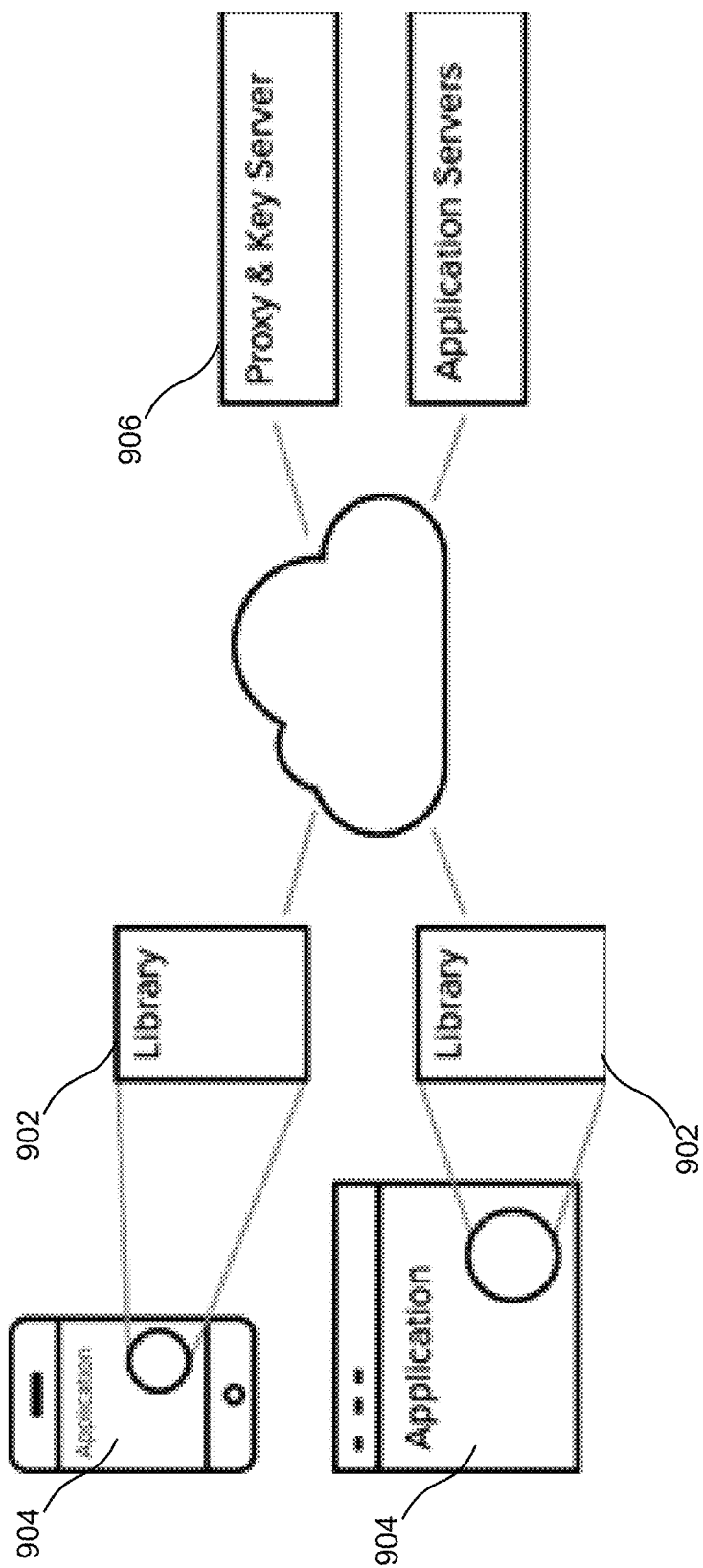
FIG. 9 illustrates a system comprising a library that is embedded in an application, along with a service that acts as a proxy, and also as a key server, storing public keys for groups and users and allowing clients to retrieve them.

FIG. 9 illustrates a system comprising a library 902 that is embedded in an application 904, along with a service 906 that acts as a proxy 906, and also as a key server 906, storing public keys for groups and users and allowing clients to retrieve them. To facilitate compatibility of this system with a variety of applications and systems, the PRE library 902 may not handle user authentication. The application 904 can be responsible for providing a signed assertion of the user's identity; the system is configured with the public key to validate the signature for the application 904. Likewise, the system does not handle the storage of encrypted application data; the application 904 is free to store this data in a way that is compatible with the rest of the application.

FIG. 10 illustrates an embodiment of data (e.g., a document) being encrypted to a group of users or devices by utilizing the group's public key. Here, the data can be encrypted to the group using the group's public key to form a ciphertext.

Figure 11:
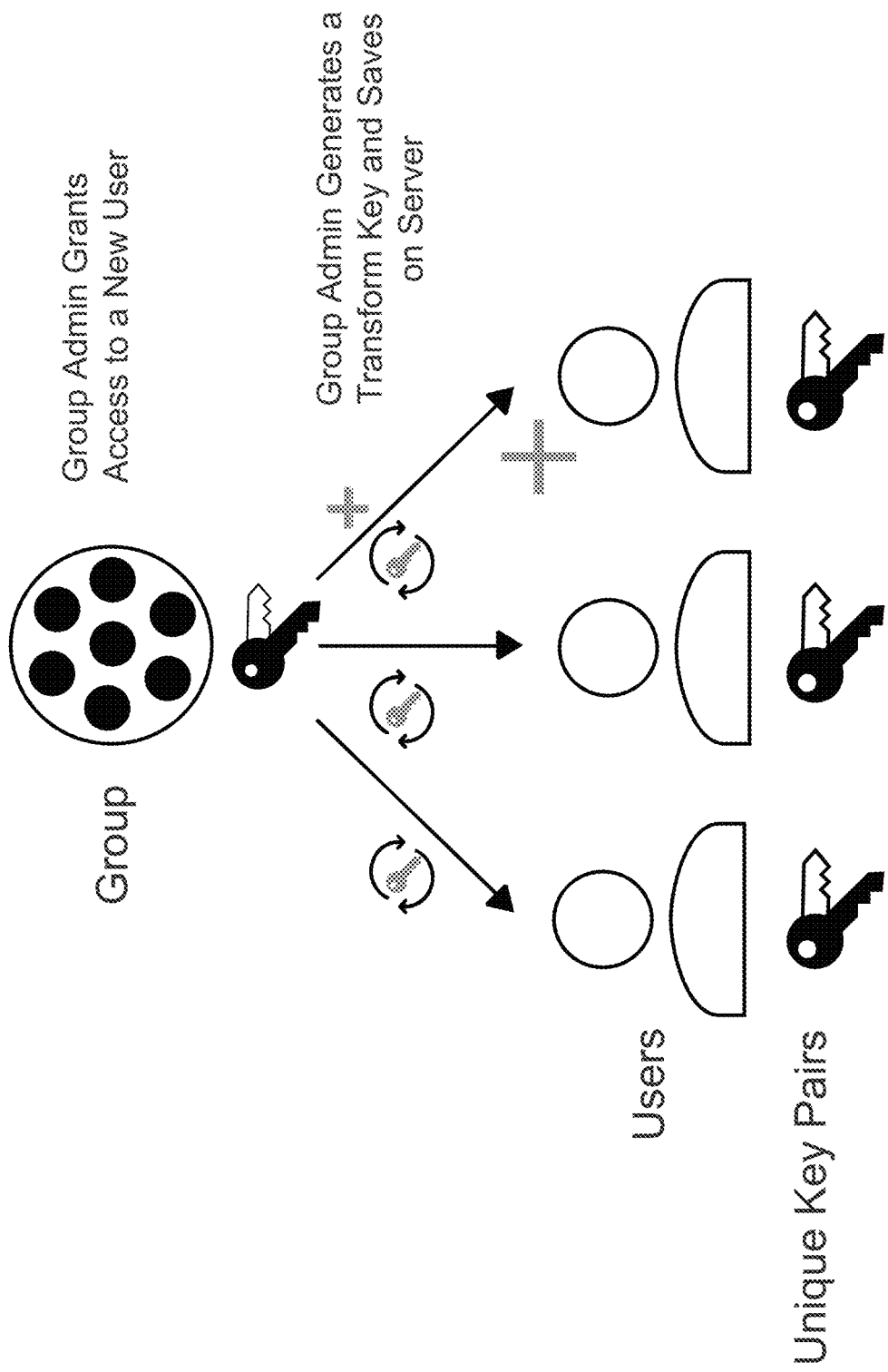
FIG. 11 illustrates an administrator adding a new user to a group of users.

FIG. 11 illustrates an administrator adding a new user to a group of users. This can involve the administrator computing a transform key from the group of users to the new user and storing this transform key on a server. Typically, a new user has already generated a new key pair for herself since the public key in this pair is used along with the group private key to generate the group-to-user transform key.

When encrypting, one does not need to know which users belong to the group. A user merely encrypts to the group, and the server can use the appropriate transform key from the group to a user to produce a transformed ciphertext, and the user can then use their private key to decrypt the transformed ciphertext. If data is encrypted to a group and also directly to a member of that group, two encryptions would occur: one to the group's public key and one to the user's public key. If that user requests access to the data, the system would determine a shortest path to access the data, which in this example would mean selecting the data encrypted directly to the user (e.g., there is one less hop to transform from the user to the device than to transform from the group to the user and then from the user to the device).

Figure 12:
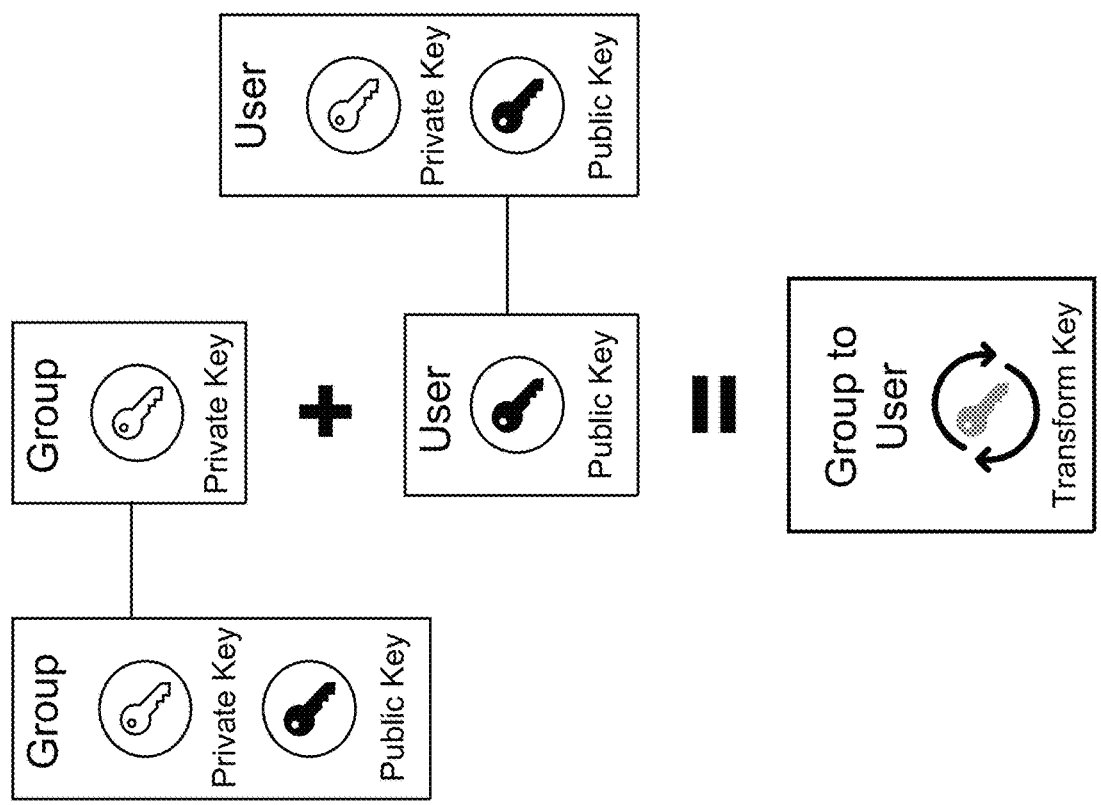
FIG. 12 illustrates an embodiment of a method of creating a transform key from a group of users to a user in that group.

FIG. 12 illustrates an embodiment of a method of creating a transform key from a group of users to a user in that group (or a group-to-user transform key). This can be performed by the group administrator using one of the group administrator's devices. The administrator has access to the group's private key and can therefore generate the transform key using the group's private key and the user's public key.

Figure 13:
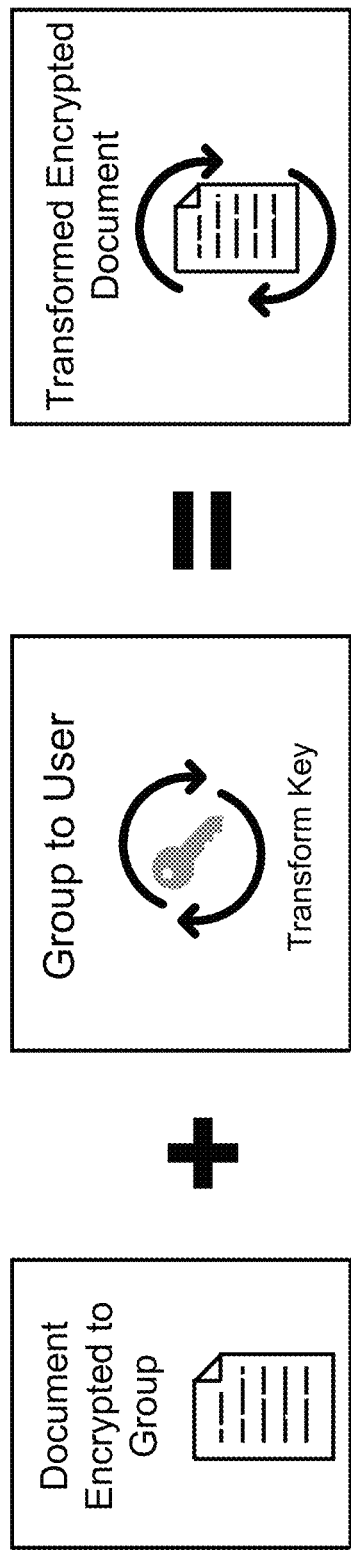
FIG. 13 illustrates an embodiment of a method for encrypting data to a group of users.
Figure 14:
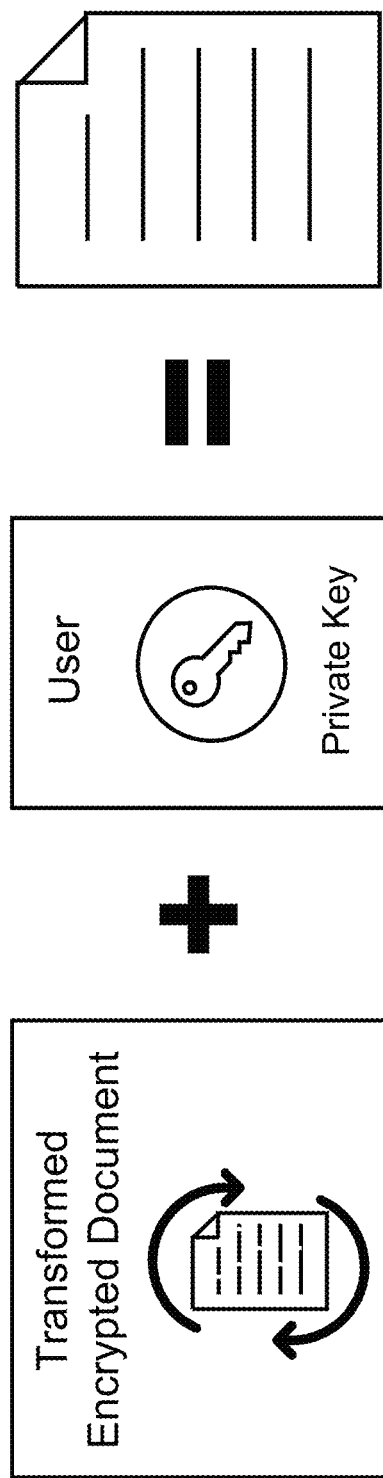
FIG. 14 illustrates another embodiment of a method for decrypting data encrypted to a group of users.

FIGS. 13 and 14 illustrate an embodiment of a method for decrypting data (e.g., a document) encrypted to a group of users (i.e., a ciphertext such as that created in FIG. 10). FIG. 13 shows that data encrypted to a group (e.g., by encrypting the data with the group's public key), or a ciphertext, can be transformed to a transformed ciphertext (or transformed encrypted document) using the transform key (from the group to a specific user). FIG. 14 then shows how the transformed ciphertext (or transformed encrypted document) can be decrypted by the user, via use of the user's private key.

Figure 15:
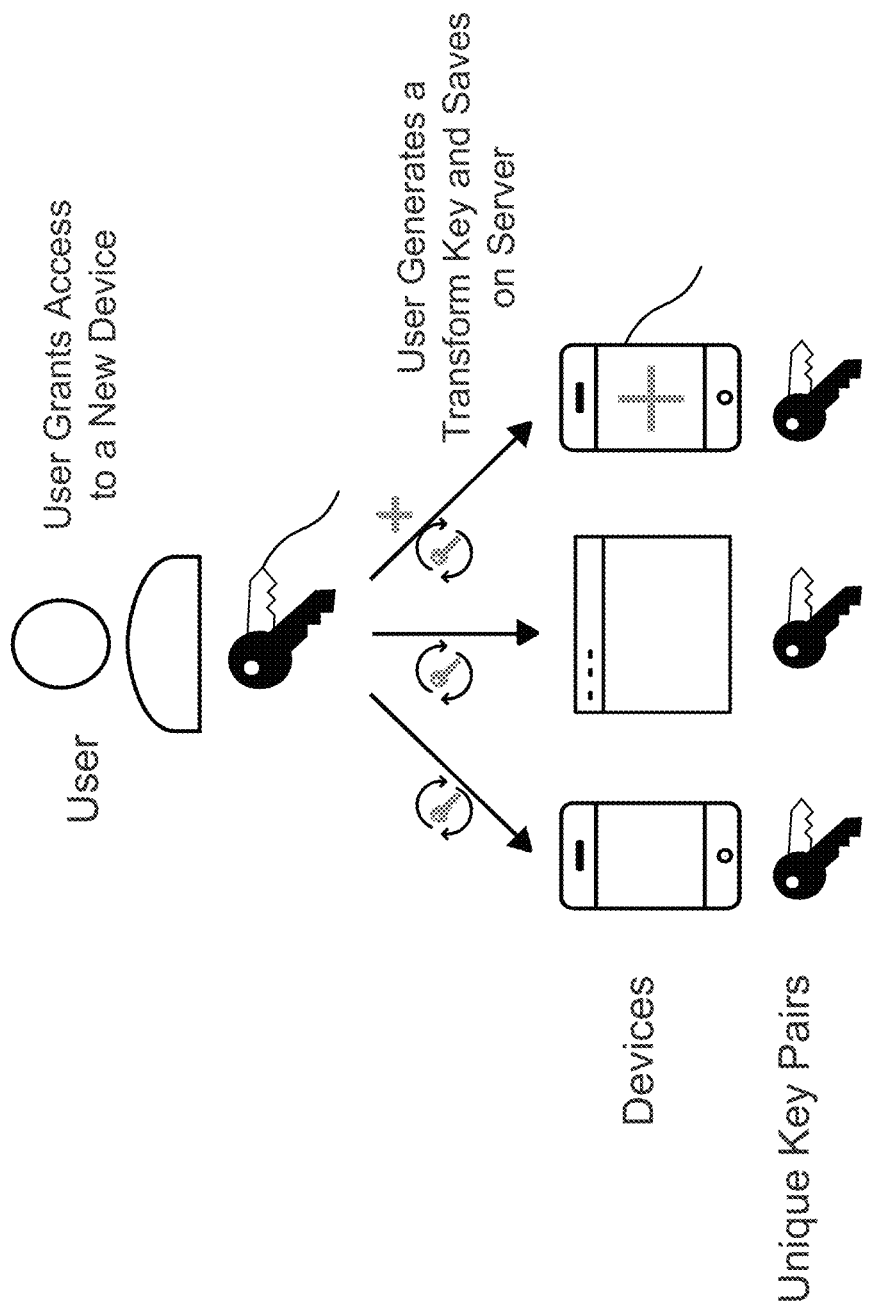
FIG. 15 illustrates an embodiment of a user granting one of her devices access to her data.

FIG. 15 illustrates an embodiment of a user granting one of her devices access to her data. This can also be referred to as adding a device to a group of devices administered by the user. It involves generating a transform key from the user's private key to the new device's public key (i.e., generating a transform key from the user to the device using the user's private key and the new device's public key).

Figure 16:
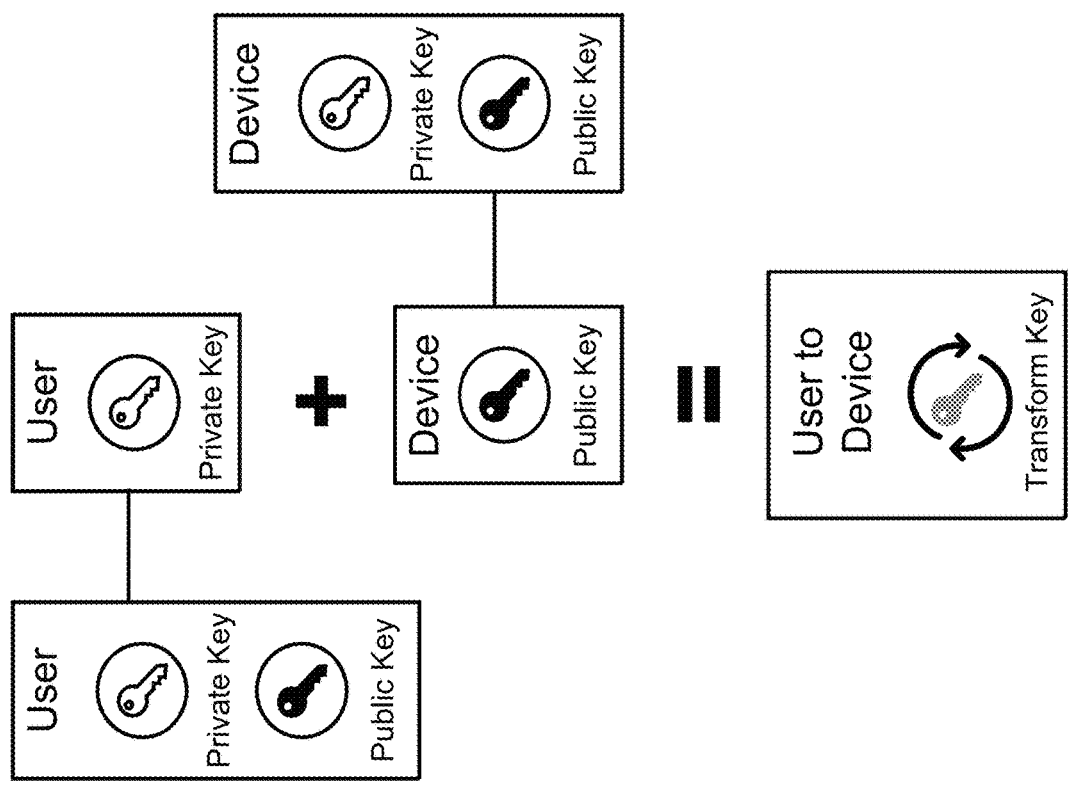
FIG. 16 illustrates an embodiment of generating a transform key from a user to a device.

FIG. 16 illustrates an embodiment of generating a transform key from a user to a device. The user can perform this method on one of her one or more devices, including the device illustrated. The process can involve generating a transform key from the user's key to the device's key (i.e., using the user's private key and the device's public key).

Figure 18:
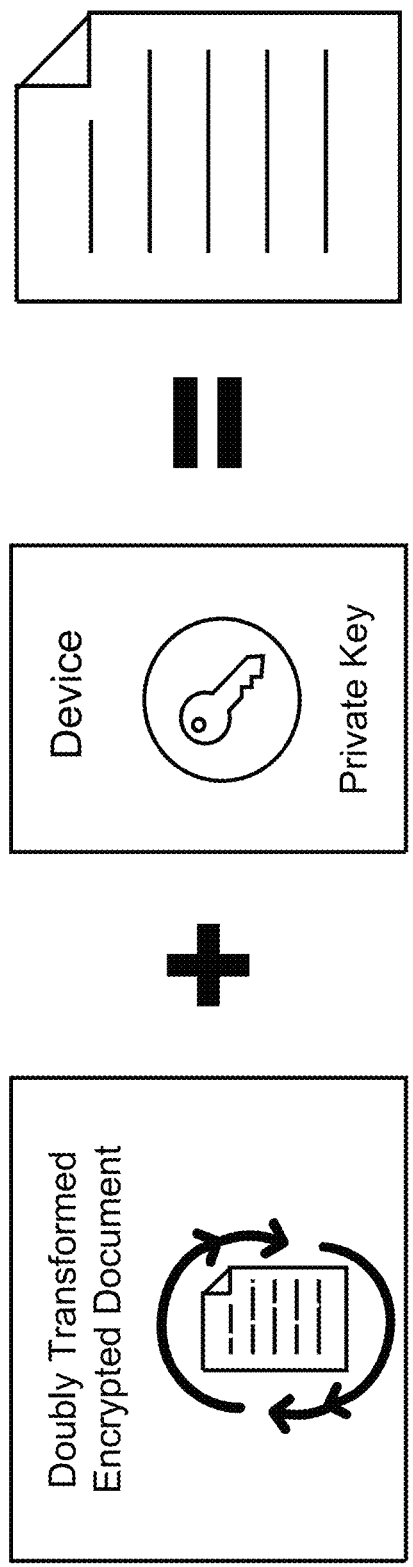
FIG. 18 illustrates an embodiment of a method for decrypting a doubly-transformed ciphertext.

Data that has been encrypted to a group, a ciphertext, can be accessed by a device belonging to a user of the group by further transforming the ciphertext into a doubly-transformed ciphertext as shown in FIG. 17. Here, data encrypted to a group has already been transformed to a transformed ciphertext (recall FIG. 13) and is then further transformed to a doubly-transformed ciphertext using the user-to-device transform key. FIG. 18 illustrates how the device can then decrypt this doubly-transformed ciphertext using the private key for the device.

Figure 19:
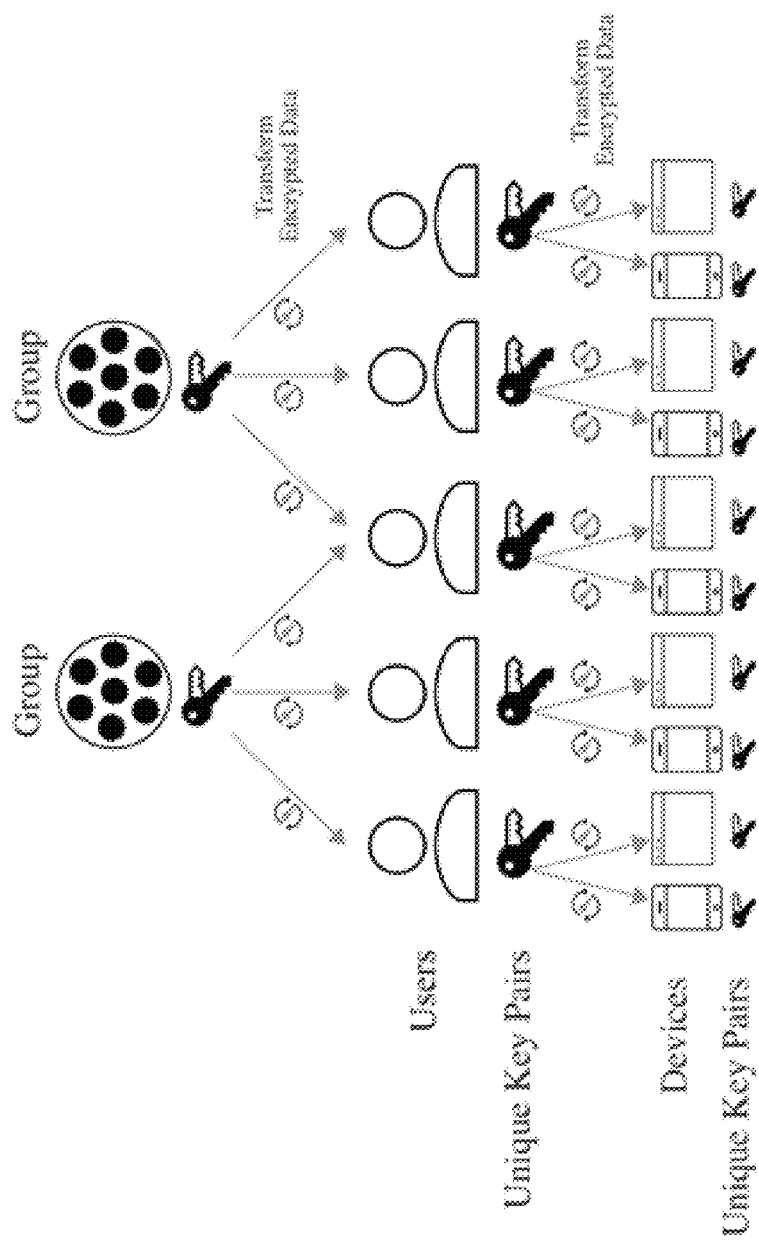
FIG. 19 illustrates a system to provide orthogonal access control for multiple groups using multi-hop transform encryption.

FIG. 19 illustrates a system to provide orthogonal access control for multiple groups using multi-hop transform encryption. The system includes a first group and a second group, each group comprising three users, where the third user is a member of both groups. Each user can generate a private and public key pair for themselves, after which a transform key from each group to each user can be generated by the administrator of each group. Although a "user" generates these keys, in practice, the actual key generation occurs on a device, such as one of one or more devices owned/controlled by a given user. Each user can also have one or more devices, where each users' devices can be part of a group of devices. So, for instance, there are five groups of devices shown, each administered by the devices' user. Each device can generate its own public and private key pair.

In an embodiment, one or more of the private keys (for the groups, users, and/or devices) can be encrypted and stored on the server.

Figure 25:
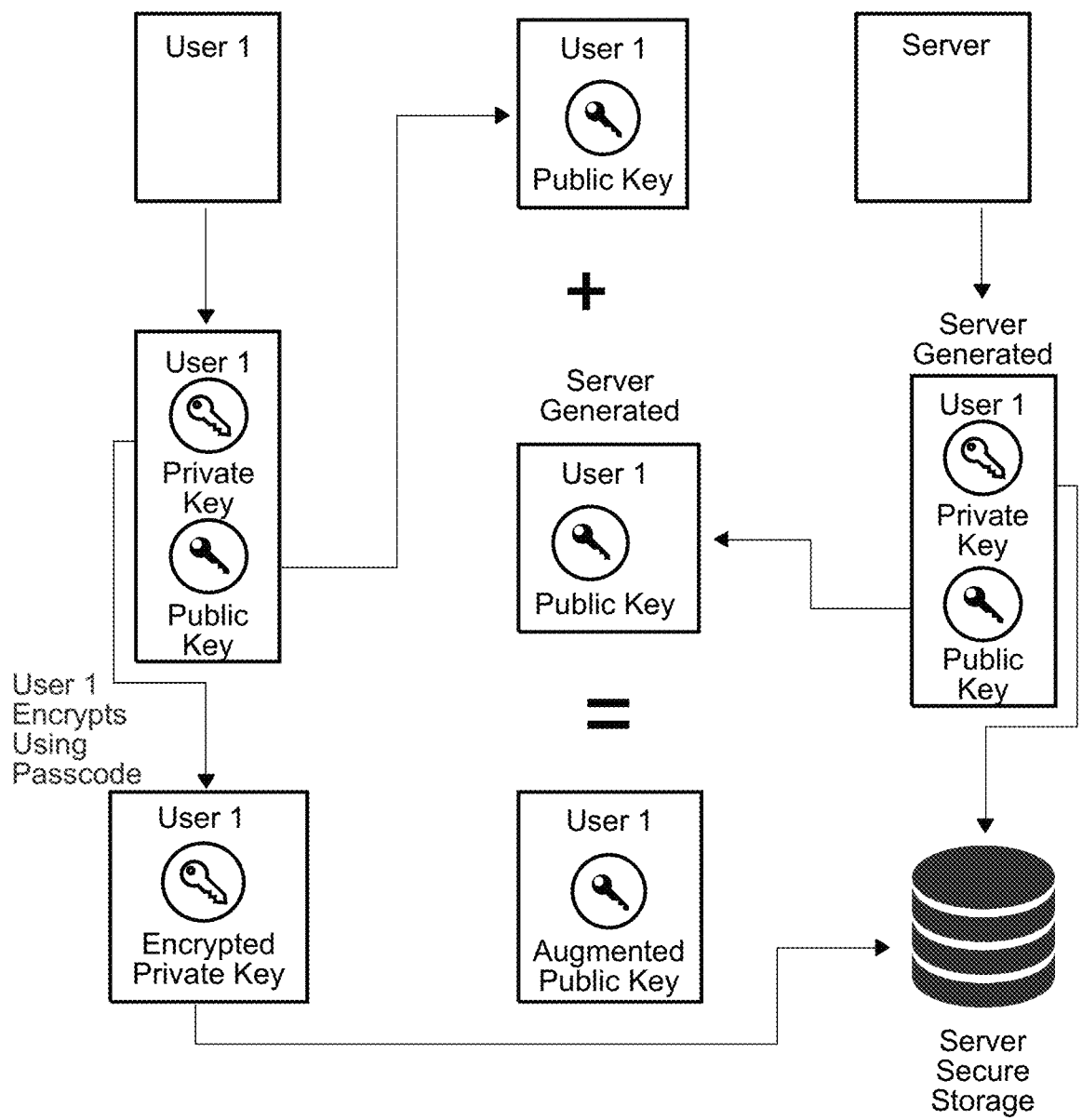
FIG. 25 illustrates an embodiment of forming a public key and a private key for a user where this operation is split between a user and the key server.
Figure 26:
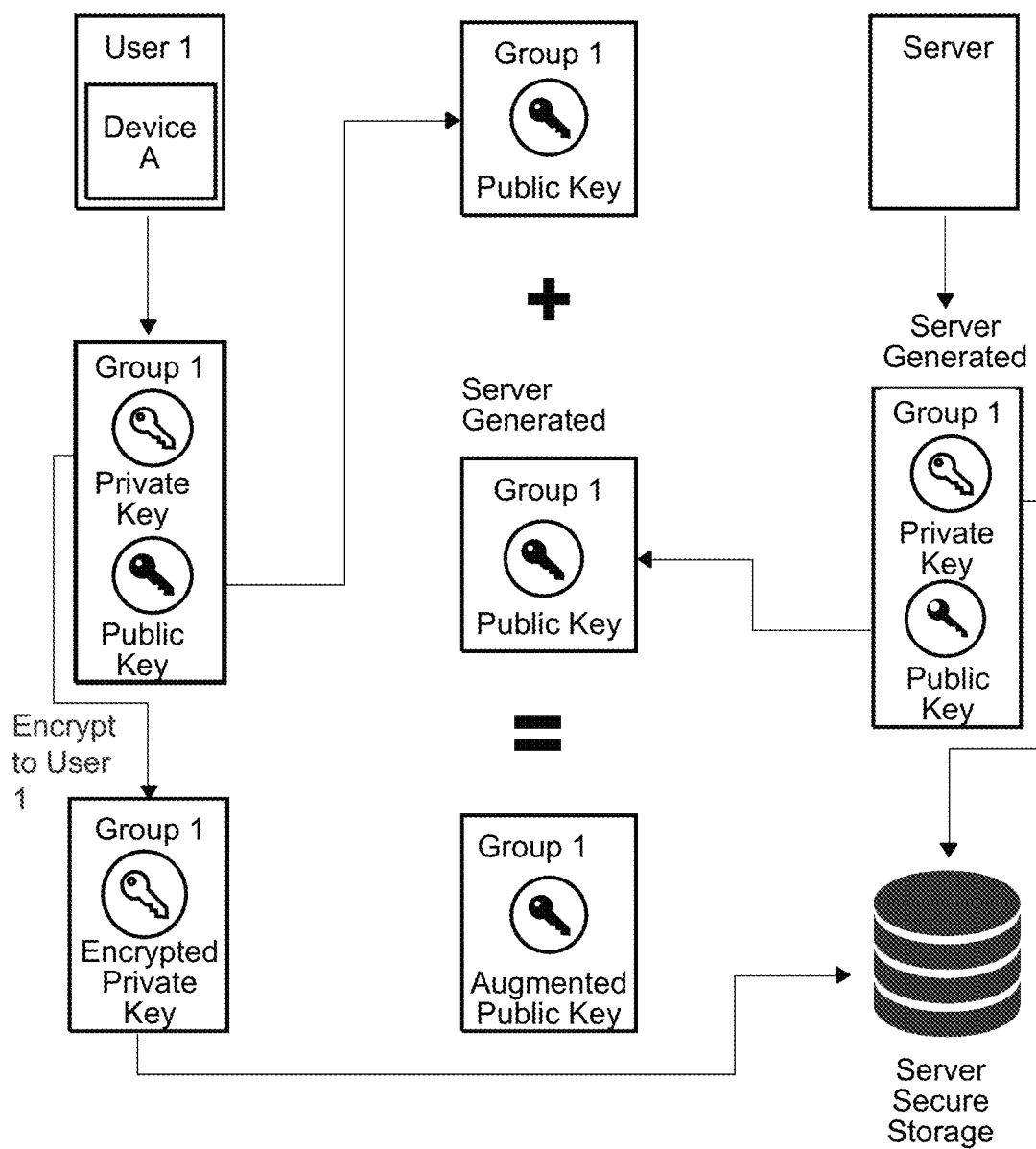
FIG. 26 illustrates an embodiment of forming a public key and a private key for a group where this operation is split between a user and the key server.

FIGS. 25 and 26 illustrate another embodiment, wherein operations to form public and private keys can be split between a user and the server (also known as augmented key formation). For instance, when generating public and private key pairs, both the user and the server could create separate key pairs, and then the user can provide its version of the public key to the server, which then forms an augmented public key from its version and the user's version of the public key. Since the user does not have access to the server's version of the private key, and the server does not have access to the user's version of the private key, neither the user nor the server can access data encrypted to the augmented public key (since neither entity can access both versions of the private key needed to form the augmented private key, needed to decrypt any data encrypted to the augmented public key). Similarly, the user and server can work cooperatively to form augmented transform keys; the user generates a transform key using its private key and sends the transform key to the server. The server uses its version of the user's private key to modify a component of the transform key, forming an augmented transform key. As such, neither the user nor the server alone can form these augmented transform keys.

Figure 20:
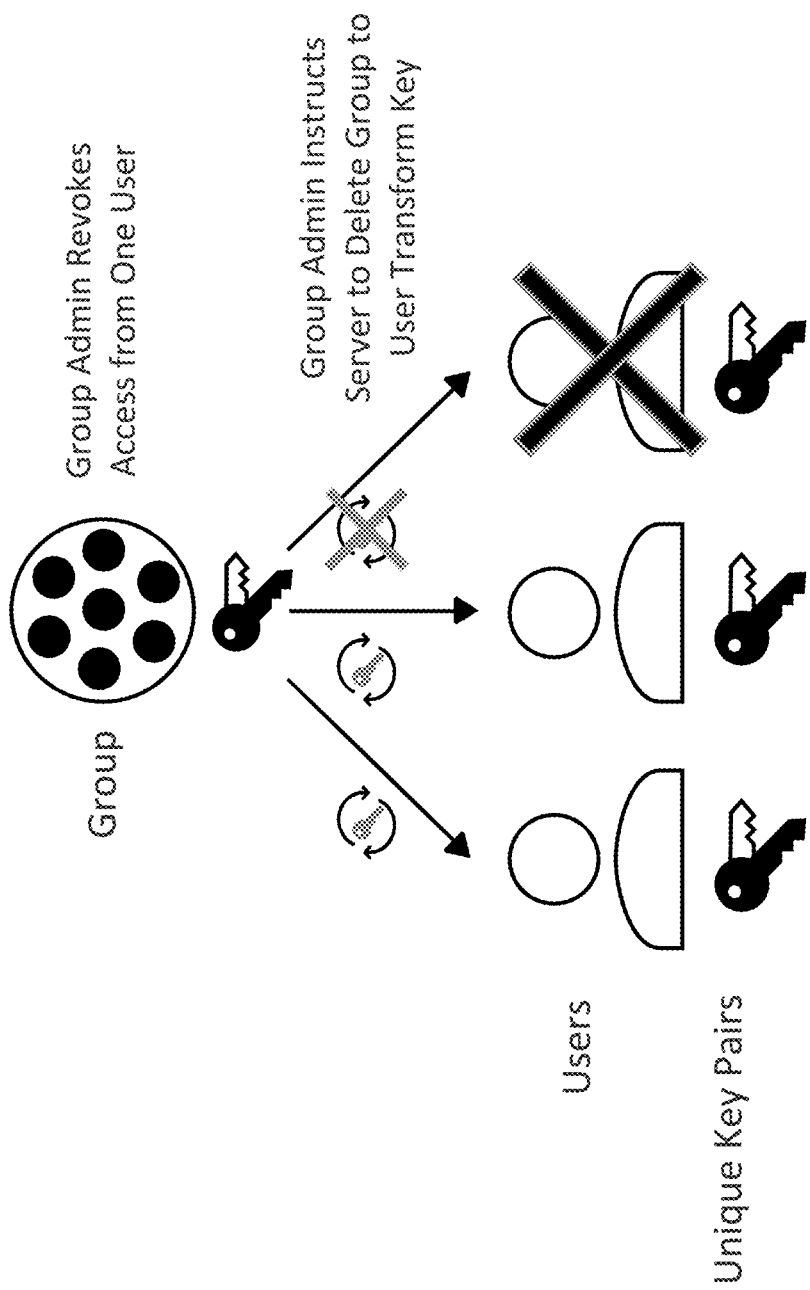
FIG. 20 illustrates an embodiment of a user being removed from a group of users.

FIG. 20 illustrates an embodiment of a user being removed from a group of users. Only an administrator of the group can revoke a user's membership in the group. This is done by deleting the transform key from the group to the user. Where the transform key is stored on a server, the administrator, via one of the administrator's devices, may instruct the server to delete the transform key from the group to the user being removed. More specifically, the administrator can request that the key server remove a user from a group. The key server can confirm that the requesting user is an administrator of the group and if so, can look up the group-to-user transform key for the group and if found, can delete this group-to-user transform key.

To revoke access to a specific document, the encryption client on a device belonging to the user trying to revoke document access can pass a document ID, current user ID, and an ID of the user or group whose access is being revoked, to the key server. The key server can confirm that the requesting user has access to the document by finding any encrypted document encryption key (EDEK) that was encrypted to the public key of the user or group whose access is being revoked. If such an EDEK is found, the key server deletes that EDEK.

To update an encrypted document, an encryption client can verify that the current user has access to the document by searching for a path from the document to the user. If this exists, then the encryption client randomly chooses a new DEK and uses it to symmetrically encrypt the new/modified version of the document. The encryption client then requests the list of EDEKs from the key server. For each EDEK, it retrieves the corresponding public key, and it encrypts (e.g., invoking the Encrypt process) the new DEK using the public key. It sends the document and the replacement list of EDEKs to the key server for storage, and it returns the encrypted document to the application modifying the document for storage.

This document update process involves rotation of the DEK every time that the document is updated and thereby prevents unauthorized access that otherwise might be possible. For instance, if a user was granted access to a document at some point in time, used the system to decrypt the document, and captured the DEK from the client, she could retain this DEK. At a future time, after her access was revoked, if she could retrieve the encrypted data for an updated version of the document, she could use the DEK directly to decrypt it. By rotating the DEK each time the document is updated, she is limited to only decrypting versions of the document to which she was granted access.

Figure 21:
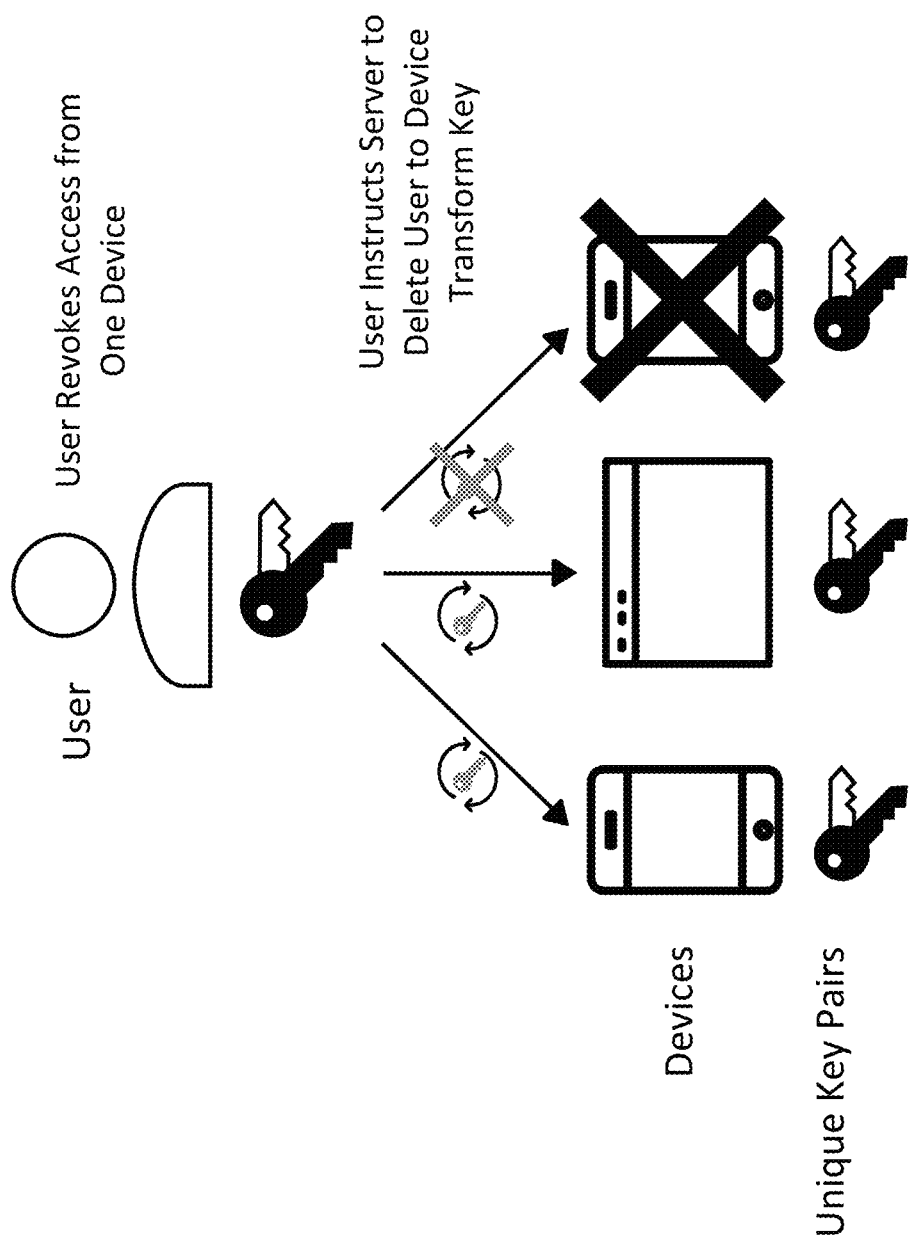
FIG. 21 illustrates an embodiment of a device being removed from a group of devices administered by a user.

FIG. 21 illustrates an embodiment of a device being removed from a group of devices administered by a user. Only the user can add and remove devices from the group. Removal involves deleting the user-to-device transform key for that device. Said another way, removing a device means revoking authorization for the device to access the user's data. If a user decides to revoke access, she uses another authorized device to perform the revocation request. The revocation request can be sent to the key server, which causes it to remove the user-to-device transform key thereby effecting removal of the device and precluding that device from decrypting any data/documents encrypted to its user. In this way an administrator can remove one of its own devices or a device belonging to another user.

FIG. 22 illustrates how data can be encrypted to a user. Namely, the user's public key can be used to encrypt the data forming a ciphertext that the user can open using his/her private key. As shown, where data is encrypted directly to a user, rather than through a group, no transform key is needed or used.

Figure 23:
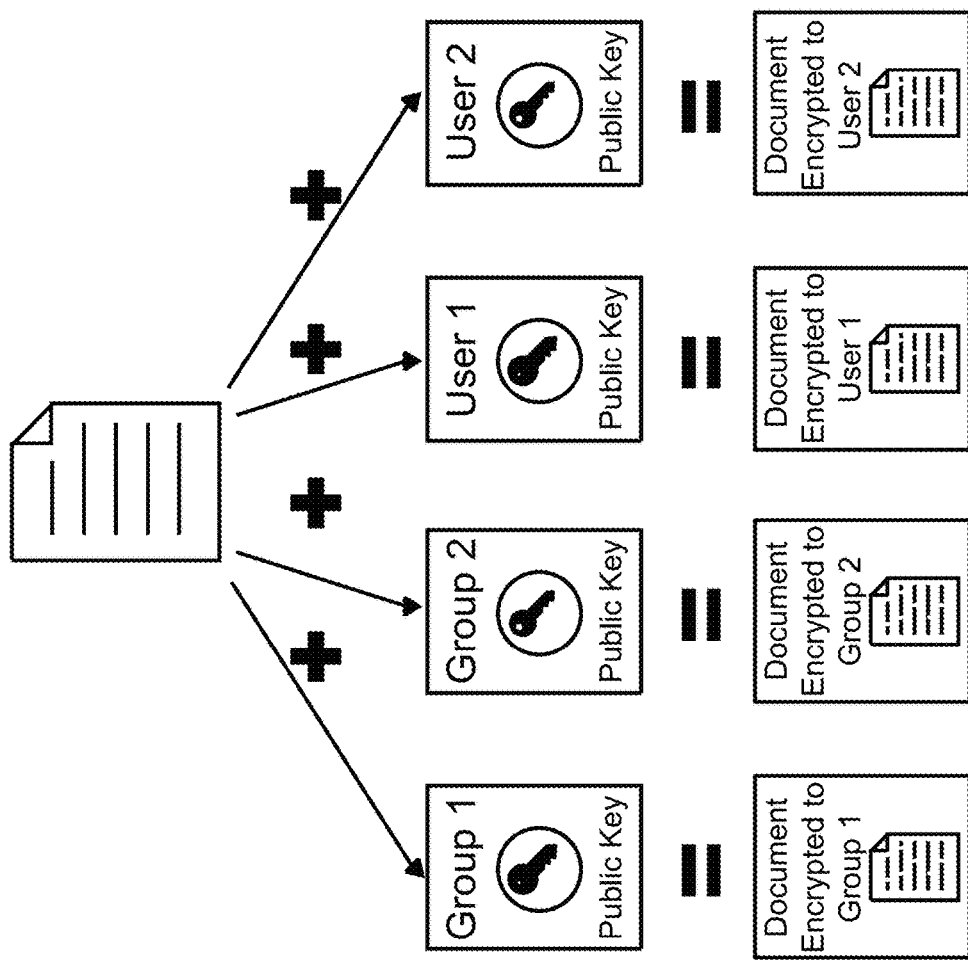
FIG. 23 illustrates a method for encrypting data to a multiplicity of groups and users.

FIG. 23 illustrates a method for encrypting data to a multiplicity of groups and users. The data can be encrypted using the public key of group 1 to form a first ciphertext (or encrypted data), the public key of group 2 to form a second ciphertext, the public key of user 1 to form a third ciphertext, and the public key of user 2 to form a fourth ciphertext.

Figure 24:
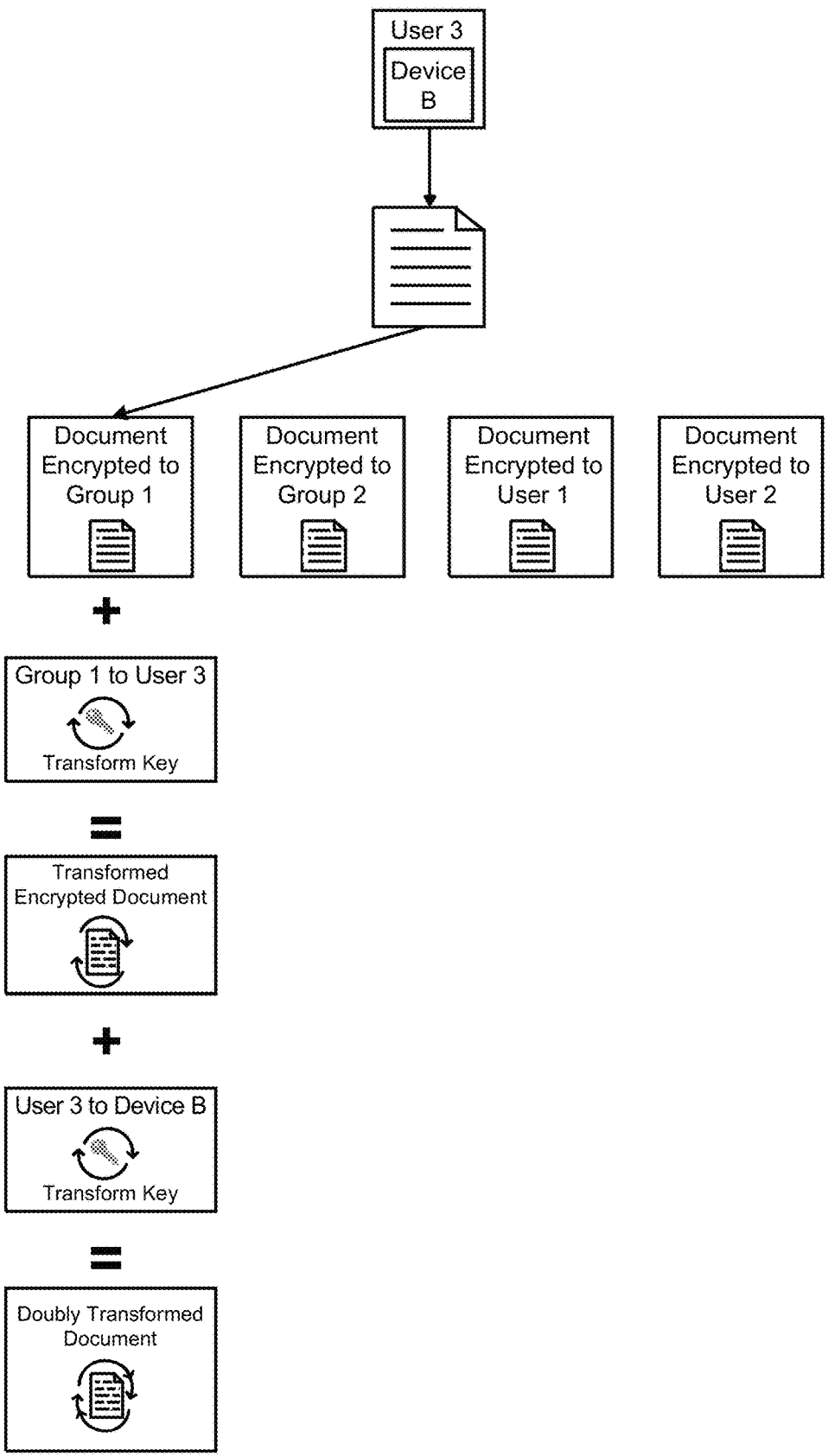
FIG. 24 illustrates a method for decrypting the first ciphertext from FIG. 23.

FIG. 24 illustrates a method for decrypting the first ciphertext from FIG. 23 (i.e., data encrypted to or shared with a group of which the user is a member). In this example, user 3 requests access to the first ciphertext, and the server uses a transform key from group 1 to the user 3 to turn the first ciphertext into a first transformed ciphertext. User is making this request via, for example, its second of two devices, device B. Therefore, the data not only passes to the user but also from the user to the device B. To make this second hop, the first transformed ciphertext is further transformed into a doubly-transformed ciphertext using a transform key for the user 3 to the device B. Device B can then apply its private key to the doubly-transformed ciphertext to decrypt and access the data (not shown).

Figure 27:
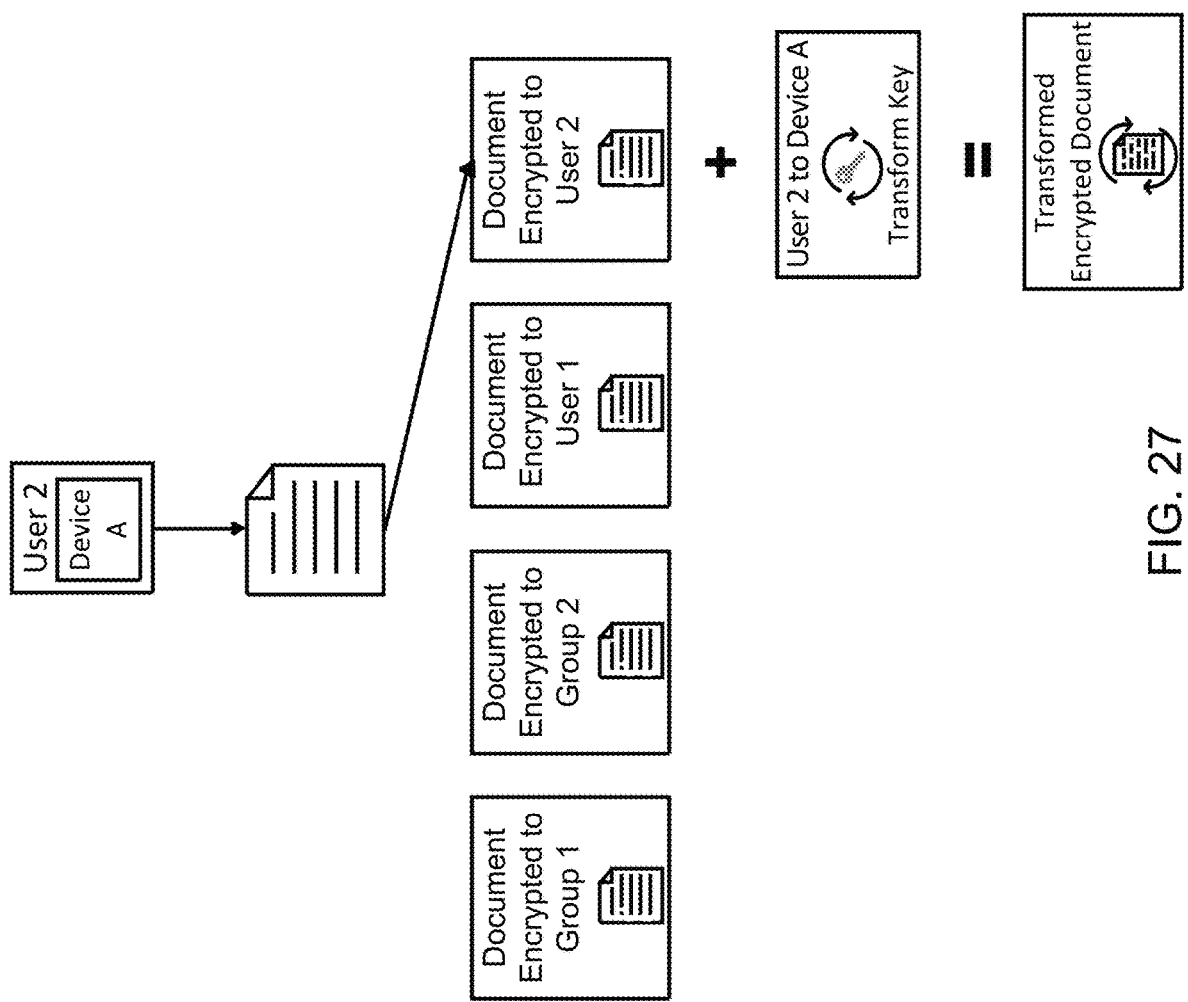
FIG. 27 illustrates a method for decrypting the fourth ciphertext from FIG. 23.

FIG. 27 illustrates a method for decrypting the fourth ciphertext from FIG. 23 (i.e., data encrypted to or shared directly with a user regardless of group membership). In this example, user 2 requests access to the fourth ciphertext, and the server uses a transform key from user 2 to a first device (e.g., device A) of user 2 to transform the fourth ciphertext to a transformed ciphertext. Device A can then apply its private key to the transformed ciphertext to decrypt and access the data (not shown).

Figure 28:
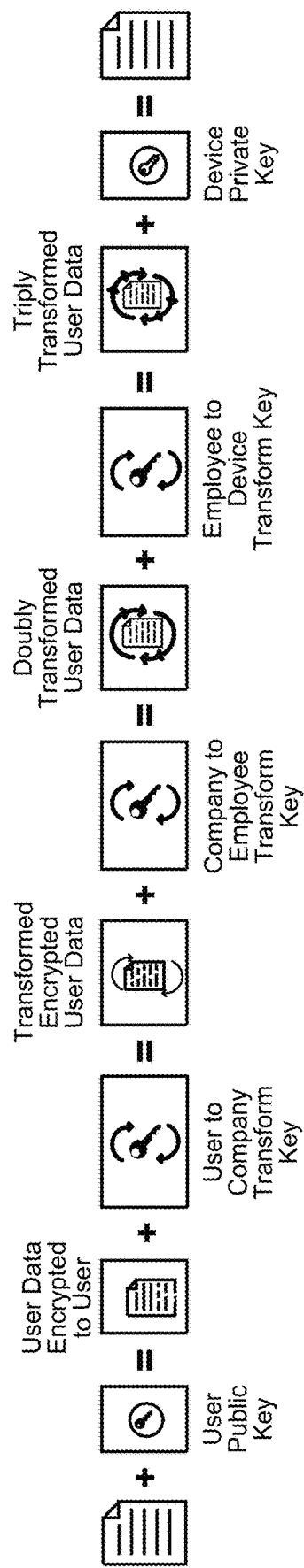
FIG. 28 illustrates a method for multi-hop transform encryption of customer data relative to a company being granted access to that data.

FIG. 28 illustrates a method for multi-hop transform encryption of customer data relative to a company being granted access to that data. When the customer's data is first captured (e.g., by the customer or by a service representative, to name two non-limiting examples), the user's data can be encrypted to the user's public key. When the customer grants the company permission to use her data, she can create a transform key from her private key to a public key of a group representing the company. If the company wishes to grant other's access to the customer's private data, then the company's administrators can grant access via creation of group-to-user transform keys for each user that is granted access to the customer's private data (i.e., added as members to the group). These users, being members of the company group, can authorize one or more of their devices to access the customer's private data by creating user-to-device transform keys. If one of these users (e.g., an authorized user) uses an authorized device (e.g., one of their devices) to access the customer's private data, then the data is transformed from the customer's key to the group's key, then transformed to the user's key, then transformed to the device's key. The result can be called a triply-transformed ciphertext and can be sent to the user's device, which uses its private key to recover the customer's private data. This is just one of many use cases where group based multi-hop transform encryption enables features not possible in the prior art.

Figure 29:
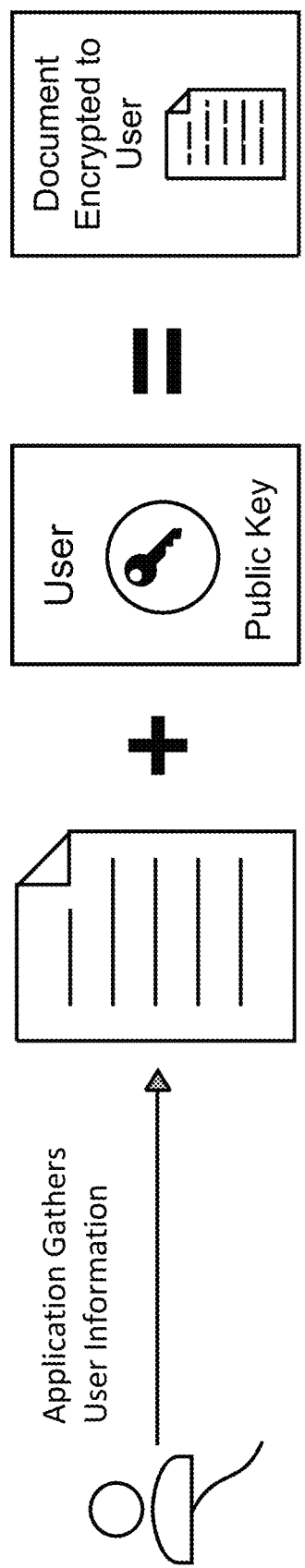
FIG. 29 provides an embodiment of details of FIG. 28.
Figure 30:
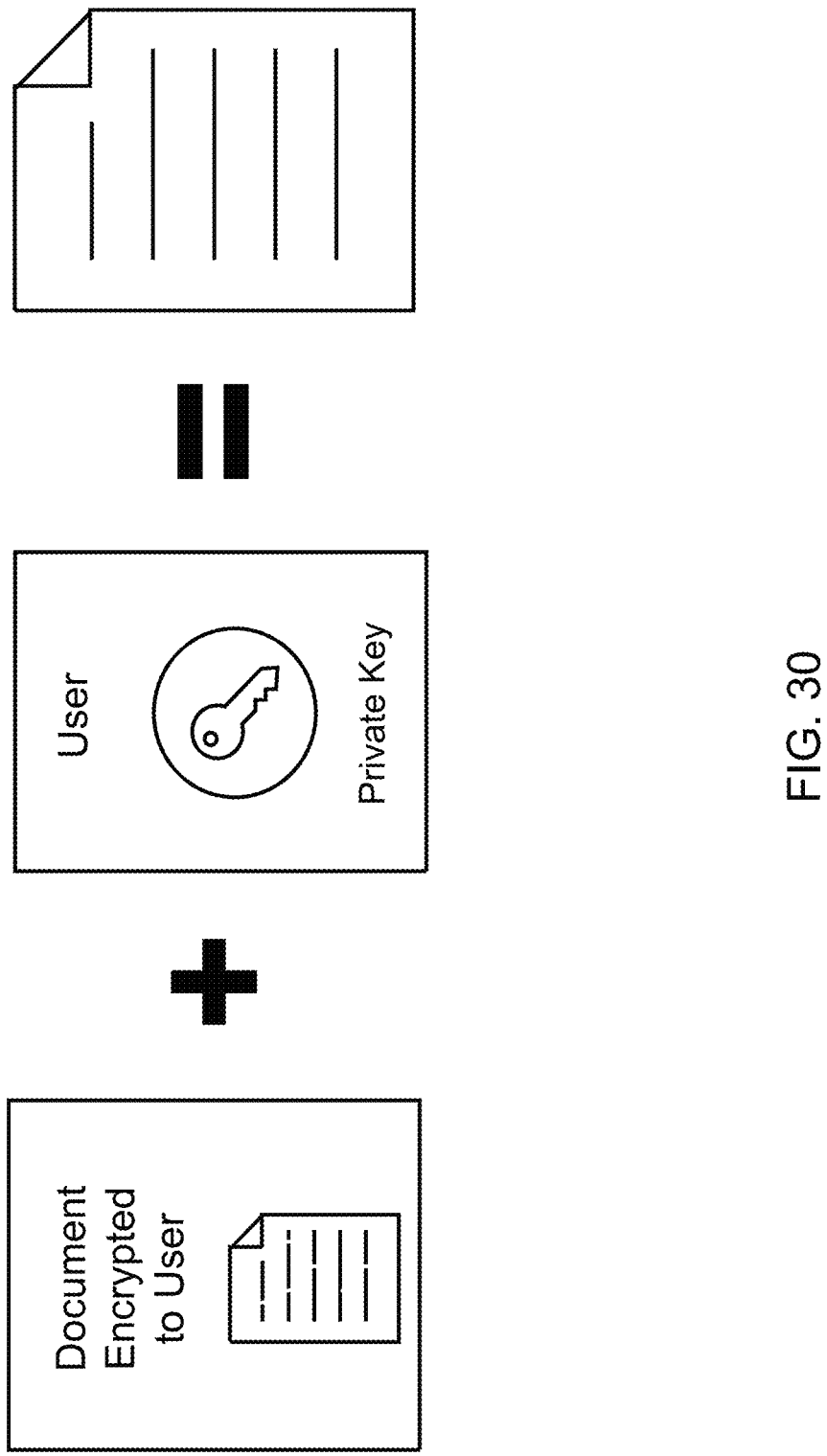
FIG. 30 illustrates an embodiment of a user requesting and decrypting her private data.

FIG. 29 illustrates further detail of the method of FIG. 28. Here a customer's data can be gathered by an application running on a device, and the device can use the customer's public key to encrypt the customer's data before the device stores the customer's data. If the customer wants to review this data, she can request the encrypted data and use her private key to decrypt it (see FIG. 30). If the user grants permission to the company to use her private data, then she creates a transform key from her user to a group that represents the company, using her private key and the public key of the company's group (see FIG. 31). This transform key can then be stored on the server. The transform key allows users that are members of the company group to transform the user's encrypted data and then decrypt it.

Figure 32:
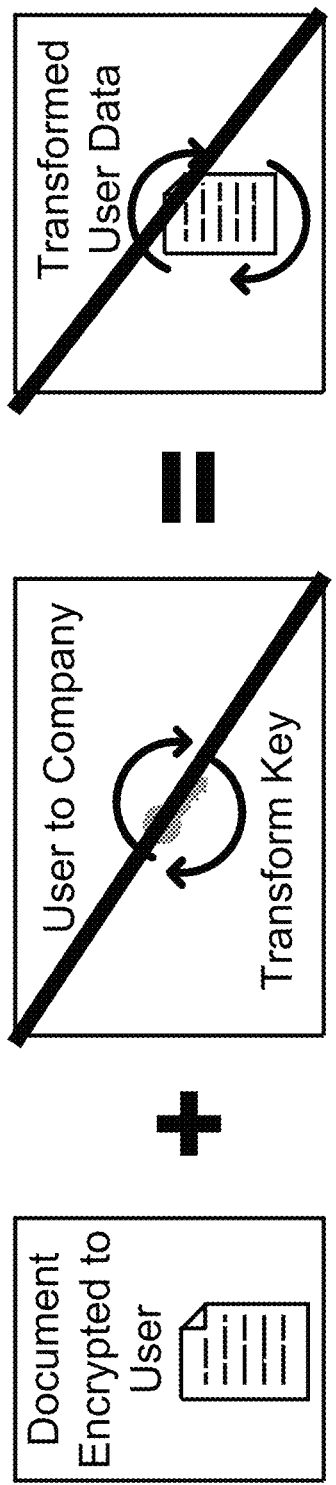
FIG. 32 illustrates an embodiment of a method of the customer invoking the right to be forgotten.
Figure 33:
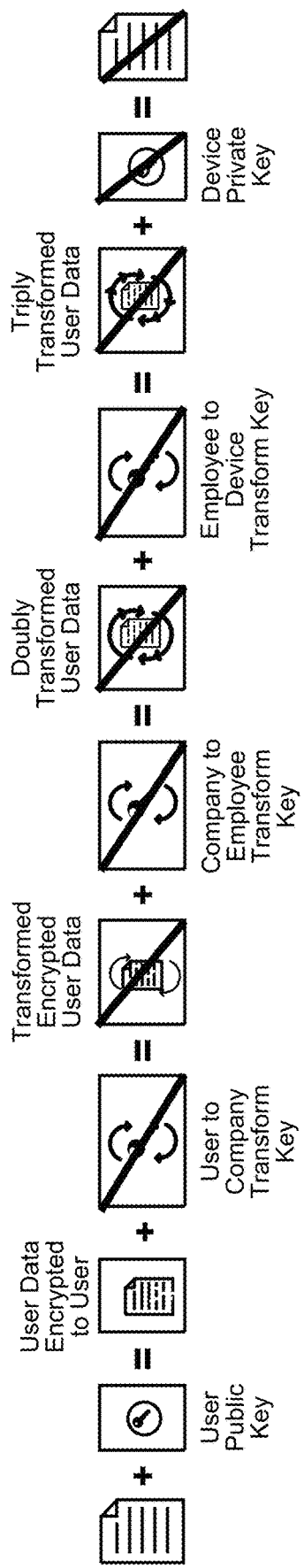
FIG. 33 illustrates a further set of steps in the method of a customer invoking the right to be forgotten.

FIG. 32 illustrates an embodiment of the customer invoking the right to be forgotten. She can instruct the server to delete the transform key from her user to the company's group. Without the transform key, everyone within the company can no longer access her data regardless of where the data is stored (e.g., on application servers, in logs, or on backup media). In other words, the right to be forgotten allows a user to revoke access to private data without having to destroy or erase the data. This right to be forgotten is further illustrated in FIG. 33.

Details of the PRE Algorithm

The herein disclosed systems and methods comprise modified versions of the PRE algorithms described in Cai and Liu (Y. Cai and X. Liu. 2014. *A Multi-use CCA-secure Proxy Re-encryption Scheme*. IEEE 12th International Conference on Dependable, Autonomic, and Secure Computing 7 (2014)). For instance, this disclosure uses a single proxy that performs all transformations for multiple hops at the same time. Also, while the Wang algorithm (H. Wang and Z. Cao. 2009. A Fully Secure Unidirectional and Multi-use Proxy Re-encryption Scheme. *ACM CCS Poster Session* (2009)) computes an authentication code for each hop using relatively expensive pairing, this disclosure's encryption and transform encryption modules sign the entire ciphertext, or transformed ciphertext, by computing a simple hash of the text then signing the hash with a much faster Ed25519 signature, using a separate signing key.

The following algorithms comprise the herein disclosed modified versions of the Cai and Liu PRE scheme (note that this disclosure uses TransformKeyGen rather than ReKeyGen and Transform rather than ReEncrypt)

Let params=$(k,p,G_1,G_T,e,g,g_1,SHA256,H_2,Sig)$ be public parameters, where:
  k is the number of bits required to store keys;
  p is a prime;
  $G_1$ and $G_T$ are abelian groups with $G_1$ written additively and $G_T$ written multiplicatively. (Throughout, we will use bold to denote elements of $G_1$.)
  e: $G_1 \times G_1 \rightarrow G_T$ is a bilinear pairing;
  g is an arbitrary fixed nonzero element of $G_1$
  $g_1$ is a random element of $G_1$ which does not lie in the cyclic subgroup generated by g.
  SHA256: $\{0,1\}^* \rightarrow$ 256-bit hash and $H_2: G_T \rightarrow G_1$ are two one-way collision-resistant hash functions.
  Sig=(G, S, V) is the Ed25519 strongly unforgeable signature scheme, comprising a key generation algorithm G, a signing algorithm S, and a verification algorithm V.

KeyGen(params)$\rightarrow$(pk,sk)): Generate a public/private key pair.
  secret key sk$\leftarrow_R \mathbb{Z}_p$
  public key pk$\leftarrow$sk·g
Transform KeyGen(params,$sk_i,pk_j,(spk_i,ssk_i))\rightarrow tk_{i \rightarrow j}$:
  This transform key generation process generates a transform key from user i (the delegator) to user j (the delegatee). The process uses the delegator's private key ($sk_i$), the delegatee's public key ($pk_j$), and the delegator's signing key pair ($spk_i,ssk_i$), and it produces a transform key that is a tuple of five values (tpk,eK,spk,sig,tep).
  transform key pair $(tpk,tsk)\leftarrow$KeyGen
  transform value K$\leftarrow_R G_T$
  encrypted transform value eK$\leftarrow$K·$e(pk_j,g_1)^{tsk}$
  signature sig$\leftarrow$S(tpk$\|$eK$\|$spk$_i$,ssk$_i$)
  transform point tep$\leftarrow H_2(K)+(-sk_i)\cdot g_1$
  transform key $tk_{i \rightarrow j}\leftarrow$(tpk,eK,spk,sig,tep)
  Note that the signature does not include tep. In the transformation process, this value does not get copied into the transform block, so omitting it from the signature allows the signature to be copied into the transform block and verified if desired. The transform key $tk_{i \rightarrow j}$ can be sent to the key server via a secure channel.
Encrypt(params,m,$pk_j,(spk_i,ssk_i))\rightarrow C_j$:
  Encrypt a message $m \in G_T$ to delegatee j, given j's public key ($pk_j$) and the sender i's signing key pair ($spk_i,ssk_i$). Produces a ciphertext $C_j$ that is a tuple of five values:
  ephemeral key pair (epk,esk)$\leftarrow$KeyGen
  encrypted message em$\leftarrow$m·$e(pk_j,g_1)^{esk}$
  authentication hash ah$\leftarrow$SHA256(epk$\|$m)
  signature sig$\leftarrow$S(epk$\|$em$\|$ah$\|$spk$_i$,ssk$_i$)
  ciphertext $C_j\leftarrow$(epk,em,ah,spk,sig)
  Transform(params,$C_i,tk_{i \rightarrow z}$,(spk,ssk))$\rightarrow C_j$—or—
  Transform(params,$C_i,[tk_{i \rightarrow a}, \ldots ,tk_{y \rightarrow z}]$,(spk,ssk))$\rightarrow C_j$
  Transform a ciphertext encrypted to i ($C_i$) into a ciphertext encrypted to j ($C_j$), given a list of one or more transform keys (tk), provided in the order in which they must be applied, and the key server's signing key pair (spk, ssk). (This operation is performed by the server rather than the client.)
  First, validate the signature on the encrypted message and on each of the transform keys:
  If any parse or verify step fails, return $\perp$
  Parse $C_i$ into (epk,em,ah,spk$_m$,sig$_m$)
  Verify V(epk$\|$em$\|$ah$\|$psk$_m$,sig$_m$,spk$_m$)

Parse each tk into $(tpk,eK,spk_{tk},sig_{tk},tep)$
Verify $V(tpk\|eK\|spk_{tk},sig_{tk},spk_{tk})$
Apply the first transform from the list:
random key pair $(rpk,rsk) \leftarrow KeyGen$
random transform value $rK \leftarrow_R G_T$
random encrypted transform value $reK \leftarrow rK \cdot e(pk_j,g_1)^{rsk}$
transformed encrypted message $em' \leftarrow em \cdot e(epk,tep+H_2(rK))$
modified ciphertext $C'_i \leftarrow (epk,em',ah)$
transform block $TB \leftarrow (tpk,eK,rpk,reK)$
transformed ciphertext $C_j \leftarrow (C'_i,TB)$
If there are additional transform keys in tk, process each of them in turn.
Parse the last transform block of $C_j$ into $(tpk_{prev},eK_{prev}, rpk_{prev},reK_{prev})$
Parse the next transform key from the list, tk, into $(tpk,eK,spk_{tk},sig_{tk},tep)$
random key pair $(rpk,rsk) \leftarrow_R \mathbb{Z}_p$
random transform value $rK \leftarrow_R G_T$
random encrypted transform value $reK \leftarrow rK \cdot e(pk_j,g_1)^{rsk}$
transformed encrypted transform value $eK' \leftarrow eK_{prev} \cdot e(tpk_{prev},tep+H_2(rK))$ transformed random encrypted transform value $reK' \leftarrow reK_{prev} \cdot e(rpk,tep+H_2(rK))$ Replace $eK_{prev}$ and $reK_{prev}$ in the last transform block with $eK'$ and $reK'$
transform block $TB \leftarrow (tpk,eK,rpk,reK)$
Append TB to $C_j$
In summary, on each transformation (after the first), the last eK and reK values from the previous transformation are modified, then the first two elements of the new transform key and the new rpk and reK are appended. Note that the encrypted message em from the original ciphertext $C_i$ is only modified once, in the first transformation. After that, it is not changed again.
After all transforms have been applied, the entire transformed ciphertext is signed.
signature $sig \leftarrow S(C_j\|spk,ssk)$
$C_j \leftarrow (C_j,spk,sig)$
$Decrypt(params,C_i,sk_i) \rightarrow m$:
Decrypt a signed ciphertext ($C_i$) given the private key of the recipient i ($sk_i$). Returns the original message that was encrypted, m. As above, we return $\perp$ if any parse or verify step fails.
First, validate the signature on the ciphertext:
Extract spk and sig, the last two elements of SC
Extract C, all of $C_i$ preceding spk
Verify $V(C\|spk,sig,spk)$
To decrypt a first-level ciphertext, where C includes no transform blocks:
Parse C into (epk,em,ah)
$m \leftarrow em \cdot e(epk,(-sk_i) \cdot g_1)$
To decrypt a transformed ciphertext, where C includes i transform blocks:
Parse C into $(C',TB'^{(1)}, \ldots, TB'^{(l-1)},TB^{(l)})$
Parse C' into (epk,em',ah)
Parse $TB^{(l)}$ into $(tpk^{(l)},eK^{(l)}, rpk^{(l)},reK^{(l)})$
For each integer k in [1,l-1], parse $TB'^{(k)}$ into $(tpk^{(k)},eK'^{(k)},rpk^{(l)},reK^{(l)})$ $K^{(l-1)} \leftarrow eK^{(l)} \cdot e(tpk^{(l)},(-sk_i) \cdot g_1)$
$rK^{(l-1)} \leftarrow reK^{(l)} \cdot e(rpk^{(l)},(-sk_i) \cdot g_1)$
For each integer k from 1-2 down to 0
$K^k \leftarrow eK^{(k+1)} \cdot e(tpk^{(k+1)},-H_2(K^{(k+1)}))$
$rK^k \leftarrow reK^{(k+1)} \cdot e(rpk^{(k+1)},-H_2(K^{(k+1)})-H_2(rK^{(k+1)}))$
$m \leftarrow em' \cdot e(epk,-H_2(K^0)-H_2(rK^0))$
Finally, verify $SHA256(epk\|m)=ah$ The random elements in each transform were introduced to the original algorithms by Cai and Liu to resolve a problem they called "proxy bypass." Without those values, when a user decrypts a transformed message, she recovers the transformation value K from each of the transform keys that were applied to the message. This means, for example, that if Alice transformed a message to Bob, Bob transformed the message to Carol, and Carol transformed the message to Eve, when Eve decrypted the message, she would have the K values from all of the transform keys, and if she subsequently intercepted a message that was transformed from Alice to Bob, she could use the K from that transform key to decrypt the message. The introduction of the random elements in the transformation process does not prevent this, but the K values by themselves are not sufficient to decrypt the transformed message.

Details of the Key Augmentation Algorithm

This disclosure describes a method of augmenting the public keys of groups and users to enhance the ability to revoke the access of users associated with groups or devices associated with users.

The following algorithms comprise the herein disclosed key augmentation method.

After a device creates a public/private key pair for a group or a user and sends the public key to the key server, the key server executes the following algorithm:

$AugmentPublicKey(params,pk_d) \rightarrow (sk_{ks},pk_{aug})$
key server key pair $(pk_{ks},sk_{ks}) \leftarrow KeyGen$
augmented public key $pk_{aug} \leftarrow pk_d + pk_{ks}$ where the addition of public keys is simply addition of two points on the elliptic curve. The resulting public key is stored and distributed as the group's public key, and all data encrypted to the group is encrypted to this public key. The key server retains the group private key that it generated, $sk_{ks}$, in secure storage.

Neither party in the computation (device or key server) is able to determine the other party's secret key, even though each knows its own secret key, the component public keys, and the resulting augmented public key. Since $pk_{aug}=sk_d \cdot g+sk_{ks} \cdot g$, either party can recover the other party's public key by subtracting its own public key from the augmented public key. But recovering the other party's secret key requires solving the elliptic curve discrete logarithm problem (ECDLP).

After augmentation, any data that is encrypted to the group's public key can no longer be decrypted by the group's private key. Decryption requires possession of both the private key generated on the device and the private key generated on the key server.

To allow decryption of a message on a device without sharing the key server's private key, each transform key from the group to a user is also augmented. The transform key that is generated on the device transforms from an unaugmented group private key to an augmented user public key, so the key server uses the following algorithm to augment the transform key from the group to the user, using the same server-generated private key it used to augment the group public key.

AugmentTransformKey(params,$tk_d$,$sk_{ks}$)→$tk_{aug}$
Given an unaugmented transform key $tk_d$ generated on the device and the server-generated private key for the group, $sk_{ks}$,
Parse $tk_d$ into (tpk,eK,$spk_{tk}$,$sig_{tk}$,tep)
Verify V(tpk‖eK‖$spk_{tk}$,$sig_{tk}$,$spk_{tk}$)
Augmented transform point tep'←tep−$sk_{ks}$·$g_1$
augmented transform key $tk_{aug}$←(tpk,eK,$spk_{tk}$,$sig_{tk}$,tep')
This augmentation of the transform key is performed before the transform key is stored by the key server. The augmentation process does not give the key server access to any additional information about the group private key, so it does not allow the key server to generate new transform keys or decrypt files. But group administrators who have access to the group private key can only generate partial transform keys, which cannot be used to transform data to any user without cooperation by the key server.

This disclosure has described a single server instantiation. However, in other embodiments, a separate public key management system could be used. For instance, the systems herein disclosed could be used inside an existing application, but with the public keys stored in a separate user store (e.g., an existing user store), like a directory server.

As shown, a PRE scheme that is unidirectional, non-interactive, non-transitive, and collusion safe is a solid foundation for an end-to-end encrypted system where users do not need to trust the server to keep data secure. A multi-hop scheme allows the system to provide delegation from groups to users and from users to devices.

Figure 34:
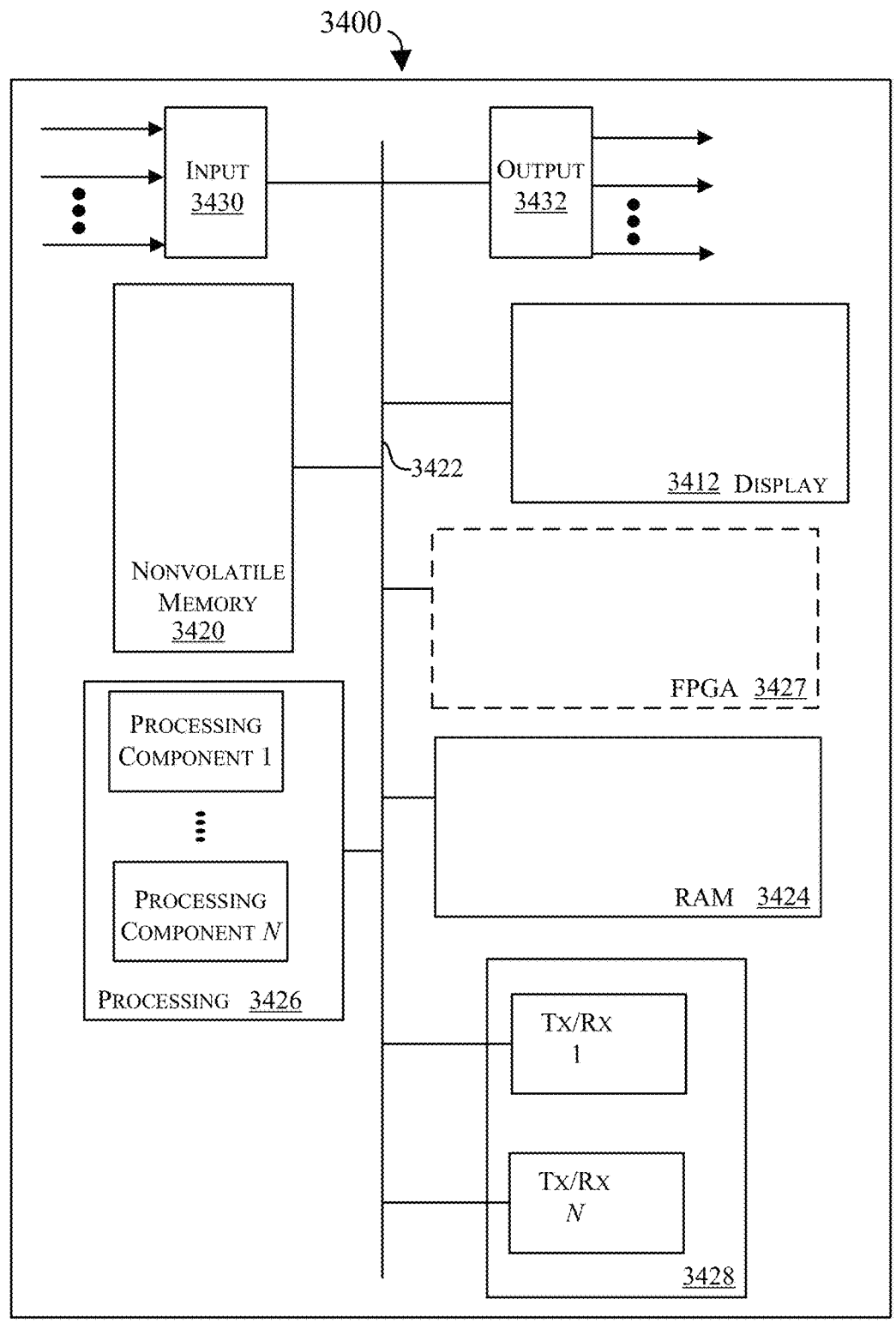
FIG. 34 shows a diagrammatic representation of one embodiment of a computer system 3400 within which a set of instructions can execute for causing a device to perform or execute any one or more of the aspects and/or methodologies of the present disclosure.

The systems and methods described herein can be implemented in a computer system in addition to the specific physical devices described herein. FIG. 34 shows a diagrammatic representation of one embodiment of a computer system 3400 within which a set of instructions can execute for causing a device to perform or execute any one or more of the aspects and/or methodologies of the present disclosure. The user devices mentioned throughout this disclosure are one implementation of the computer system 3400. A key server is another implementation of the computer system 3400. The components in FIG. 34 are examples only and do not limit the scope of use or functionality of any hardware, software, firmware, embedded logic component, or a combination of two or more such components implementing particular embodiments of this disclosure. Some or all of the illustrated components can be part of the computer system 3400. For instance, the computer system 3400 can be a general-purpose computer (e.g., a laptop computer) or an embedded logic device (e.g., an FPGA), to name just two non-limiting examples.

Computer system 3400 includes at least a processor 3401 such as a central processing unit (CPU) or an FPGA to name two non-limiting examples. The computer system 3400 may also comprise a memory 3403 and a storage 3408, both communicating with each other, and with other components, via a bus 3440. The bus 3440 may also link a display 3432, one or more input devices 3433 (which may, for example, include a keypad, a keyboard, a mouse, a stylus, etc.), one or more output devices 3434, one or more storage devices 3435, and various non-transitory, tangible computer-readable storage media 3436 with each other and with one or more of the processor 3401, the memory 3403, and the storage 3408. All of these elements may interface directly or via one or more interfaces or adaptors to the bus 3440. For instance, the various non-transitory, tangible computer-readable storage media 3436 can interface with the bus 3440 via storage medium interface 3426. Computer system 3400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 3401 (or central processing unit(s) (CPU(s))) optionally contains a cache memory unit 3402 for temporary local storage of instructions, data, or computer addresses. Processor(s) 3401 are configured to assist in execution of computer-readable instructions stored on at least one non-transitory, tangible computer-readable storage medium. Computer system 3400 may provide functionality as a result of the processor(s) 3401 executing software embodied in one or more non-transitory, tangible computer-readable storage media, such as memory 3403, storage 3408, storage devices 3435, and/or storage medium 3436 (e.g., read only memory (ROM)). For instance, the method 200, 300, 400, 500, and 600 in FIGS. 2-6 may be embodied in one or more non-transitory, tangible computer-readable storage media. The non-transitory, tangible computer-readable storage media may store software that implements particular embodiments, such as the methods 200, 300, 400, 500, and 600, and processor(s) 3401 may execute the software. Memory 3403 may read the software from one or more other non-transitory, tangible computer-readable storage media (such as mass storage device(s) 3435, 3436) or from one or more other sources through a suitable interface, such as network interface 3420. The user devices may include embodiments of the network interface 3420 as may the key server. The software may cause processor(s) 3401 to carry out one or more processes or one or more steps of one or more processes described or illustrated herein. Carrying out such processes or steps may include defining data structures stored in memory 3403 and modifying the data structures as directed by the software. In some embodiments, an FPGA can store instructions for carrying out functionality as described in this disclosure (e.g., the methods 200, 300, 400, 500, and 600). In other embodiments, firmware includes instructions for carrying out functionality as described in this disclosure (e.g., the methods 200, 300, 400, 500, and 600).

The memory 3403 may include various components (e.g., non-transitory, tangible computer-readable storage media) including, but not limited to, a random-access memory component (e.g., RAM 3404) (e.g., a static RAM "SRAM", a dynamic RAM "DRAM, etc.), a read-only component (e.g., ROM 3405), and any combinations thereof. ROM 3405 may act to communicate data and instructions unidirectionally to processor(s) 3401, and RAM 3404 may act to communicate data and instructions bidirectionally with processor(s) 3401. ROM 3405 and RAM 3404 may include any suitable non-transitory, tangible computer-readable storage media described below. In some instances, ROM 3405 and RAM 3404 include non-transitory, tangible computer-readable storage media for carrying out the methods 200, 300, 400, 500, and 600. In one example, a basic input/output system 3406 (BIOS), including basic routines that help to transfer information between elements within computer system 3400, such as during start-up, may be stored in the memory 3403.

Fixed storage 3408 is connected bidirectionally to processor(s) 3401, optionally through storage control unit 3407. Fixed storage 3408 provides additional data storage capacity and may also include any suitable non-transitory, tangible computer-readable media described herein. Storage 3408 may be used to store operating system 3409, EXECs 3410 (executables), data 3411, API applications 3412 (application programs), and the like. For instance, the storage 3408 could be implemented for storage of public keys, private keys, and transform keys as described relative to the key server and the key server throughout this disclosure. Often, although not always, storage 3408 is an identity storage medium (such as a hard disk) that is slower than primary storage (e.g., memory 3403). Storage 3408 can also include an optical disk drive, a solid-state memory device (e.g., flash-based systems), or a combination of any of the above. Information in storage 3408 may, in appropriate cases, be incorporated as virtual memory in memory 3403.

In one example, storage device(s) 3435 may be removably interfaced with computer system 3400 (e.g., via an external port connector (not shown)) via a storage device interface 3425. Particularly, storage device(s) 3435 and an associated machine-readable medium may provide nonvolatile and/or volatile storage of machine-readable instructions, data structures, program modules, and/or other data for the computer system 3400. In one example, software may reside, completely or partially, within a machine-readable medium on storage device(s) 3435. In another example, software may reside, completely or partially, within processor(s) 3401.

Bus 3440 connects a wide variety of subsystems. Herein, reference to a bus may encompass one or more digital signal lines serving a common function, where appropriate. Bus 3440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 3400 may also include an input device 3433. In one example, a user of computer system 3400 may enter commands and/or other information into computer system 3400 via input device(s) 3433. Examples of an input device(s) 3433 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 3433 may be interfaced to bus 3440 via any of a variety of input interfaces 3423 (e.g., input interface 3423) including, but not limited to, serial, parallel, game port, USB, FIREWIRE, THUNDERBOLT, or any combination of the above.

In particular embodiments, when computer system 3400 is connected to network 3430 (such as a network connecting the key server 802 and the various user devices of FIG. 8), computer system 3400 may communicate with other devices, such as mobile devices and enterprise systems, connected to network 3430. Communications to and from computer system 3400 may be sent through network interface 3420. For example, network interface 3420 may receive incoming communications (such as requests or responses from other devices) in the form of one or more packets (such as Internet Protocol (IP) packets) from network 3430, and computer system 3400 may store the incoming communications in memory 3403 for processing. Computer system 3400 may similarly store outgoing communications (such as requests or responses to other devices) in the form of one or more packets in memory 3403 and communicated to network 3430 from network interface 3420. Processor(s) 3401 may access these communication packets stored in memory 3403 for processing.

Examples of the network interface 3420 include, but are not limited to, a network interface card, a modem, and any combination thereof. Examples of a network 3430 or network segment 3430 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 3430, may employ a wired and/or a wireless mode of communication. In general, any network topology may be used.

Information and data can be displayed through a display 3432. Examples of a display 3432 include, but are not limited to, a liquid crystal display (LCD), an organic liquid crystal display (OLED), a cathode ray tube (CRT), a plasma display, and any combinations thereof. The display 3432 can interface to the processor(s) 3401, memory 3403, and fixed storage 3408, as well as other devices, such as input device(s) 3433, via the bus 3440. The display 3432 is linked to the bus 3440 via a video interface 3422, and transport of data between the display 3432 and the bus 3440 can be controlled via the graphics control 3421.

In addition to a display 3432, computer system 3400 may include one or more other peripheral output devices 3434 including, but not limited to, an audio speaker, a printer, and any combinations thereof. Such peripheral output devices may be connected to the bus 3440 via an output interface 3424. Examples of an output interface 3424 include, but are not limited to, a serial port, a parallel connection, a USB port, a FIREWIRE port, a THUNDERBOLT port, and any combinations thereof.

In addition or as an alternative, computer system 3400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 200, 300, 400, 500, and 600) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of applying transform cryptography for protecting personal data when the data has been copied and is accessible to one or more members of a first group, the method comprising:

encrypting a first person's data with a public key for the first person;

the first person creating a transform key from the first person to the first group including the one or more members;

providing access to the first person's data for the first group using the transform key and a transform cryptography;

an administrator of the first group adding and removing ones of the one or more members other than the first person of the first group by computing or deleting, respectively, transform keys from the first group to the one or more members without using the public or a private key of the first person;

the first person granting access to the first person's data to members of a second group by creating a second transform key from the first person to the second group; and the first person revoking the access to the first person's data for the first group, and thereby revoking the access of the one or more members of the first group to the first person's data, by removing the transform key from the first person to the first group, while not affecting the second group's access to the first person's data.

2. The method of claim 1, wherein the administrator uses at least a private key to add the one or more members to the first group, but cannot read any of the one or more members' data encrypted to the first group unless the administrator is one of the one or more members of the first group.

3. The method of claim 1, wherein the transform key is computed from the first person's private key and the first group's public key.

4. The method of claim 1, wherein a server storing the first person's data or performing the transform cryptography is unable to decrypt and read the first person's data, but the one or more members of the first group can use their respective private keys to access a data encryption key (DEK) and use the DEK to decrypt and read the first person's data.

5. The method of claim 1, wherein the adding and removing members from the first group operates without re-encryption of data.

6. The method of claim 5, wherein the removing members renders the first person's data inaccessible to removed members even if the first person's data is not deleted.

7. The method of claim 1, wherein an encryption client computes the transform key from the first person to the first group.

8. The method of claim 1, further comprising encrypting the first person's data with a public key for the first person while it is being collected.

9. The method of claim 1, wherein the first person determines which groups its data is encrypted to, and the administrator determines which people belong to the first group.

10. A method of protecting a first user's personal data and enabling a selective right to be forgotten even when the data has been copied to multiple un-controlled locations and is accessible to one or more additional users, the method comprising:

a. generating at a first device of a first user a public key and a private key for the first user;

b. creating a first group of users by computing first transform keys from the first group to users of the first group without using the public or private keys of the first user;

c. creating a second transform key from the first user to the first group of users and using the second transform key to provide the first group of users access to data of the first user;

d. creating a third transform key from the first user to a second group of users and using the third transform key to provide the second group of users access to the data of the first user; and e. revoking the first group's access to the first user's data by deleting the second transform key, while not affecting the second group's access to the first user's data.

11. The method of claim 10, further comprising storing the first transform keys, the second transform key and the third transform key on a first server.

12. The method of claim 10, wherein an administrator uses at least a private key to add users to the first group, but cannot read any of the users' data encrypted to the first group unless the administrator is one of the one or more users belonging to the first group.

13. The method of claim 10, wherein the second transform key is computed from the first user's private key and the first group's public key.

14. The method of claim 11, wherein a second server storing the first user's data, or the first server, is unable to decrypt and read the first user's data, but the users of the first group can use their respective private keys to access a data encryption key (DEK) and use the DEK to decrypt and read the first user's data.

15. The method of claim 10, wherein the creating the first group of users and the revoking the first group's access to the first user's data are both performed without re-encryption of data.

16. The method of claim 15, wherein the revoking the first group's access to the data does not include deletion of the data.

17. The method of claim 10, wherein an encryption client computes the second transform key from the first user to the first group.

18. The method of claim 10, further comprising encrypting the first user's data with the public key for the first user while the data is being collected.

19. The method of claim 10, wherein the first user determines which groups its data is encrypted to, and an administrator of each group determines which users belong to each group.

* * * * *